(12) United States Patent
Fujita et al.

(10) Patent No.: US 12,286,194 B2
(45) Date of Patent: Apr. 29, 2025

(54) SPROCKET SUPPORT BODY

(71) Applicant: SHIMANO INC., Sakai (JP)

(72) Inventors: Hiroshi Fujita, Sakai (JP); Kazuki Koshiyama, Sakai (JP); Takashi Nakanishi, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 17/373,777

(22) Filed: Jul. 13, 2021

(65) Prior Publication Data

US 2021/0339826 A1    Nov. 4, 2021

Related U.S. Application Data

(63) Continuation of application No. 16/145,116, filed on Sep. 27, 2018, now Pat. No. 11,097,807, which is a
(Continued)

(51) Int. Cl.
*B62M 9/10* (2006.01)
*B60B 27/02* (2006.01)
(Continued)

(52) U.S. Cl.
CPC ............. *B62M 9/10* (2013.01); *B60B 27/023* (2013.01); *B60B 27/04* (2013.01); *B60B 27/047* (2013.01);
(Continued)

(58) Field of Classification Search
CPC ..... B60B 27/04; B60B 27/047; B60B 27/023; B62M 9/10; B62M 9/12; F16D 41/30; B62K 2206/00
See application file for complete search history.

(56) References Cited

U.S. PATENT DOCUMENTS 2,382,740 A    8/1945    Noffsinger et al.
3,732,626 A    5/1973    Miller, Jr.
(Continued)

FOREIGN PATENT DOCUMENTS

CN    1186752    7/1998
CN    1704624    12/2005
(Continued)

OTHER PUBLICATIONS

South Salem Cycleworks, "SunTour bicycle hubs", https://www.sscycleworks.com/components/hubs-SunTour.html, pp. 15-21, (accessed Jan. 12, 2024) (Year: 2024).*
(Continued)

*Primary Examiner* — Kip T Kotter
(74) *Attorney, Agent, or Firm* — MORI & WARD, LLP

(57) ABSTRACT

A sprocket support body comprises at least ten external spline teeth including a plurality of external-spline driving surfaces. The plurality of external-spline driving surfaces each includes a radially outermost edge, a radially innermost edge, and a radial length. A total of the radial lengths of the plurality of external-spline driving surfaces is equal to or larger than 7 mm. At least one external-spline driving surface has a first external-spline-surface angle. The first external-spline-surface angle ranges from 0 degree to 10 degrees. One tooth of the at least ten external spline teeth having a first circumferential spline size. The other teeth of the at least ten external spline teeth each have a second circumferential spline size that is smaller than the first circumferential spline size. A total number of the other teeth of the at least ten external spline teeth being equal to or larger than nine.

20 Claims, 32 Drawing Sheets

Related U.S. Application Data continuation of application No. 15/608,915, filed on May 30, 2017, now Pat. No. 11,059,541.

(51) Int. Cl.
  *B60B 27/04* (2006.01)
  *B62L 1/00* (2006.01)
  *F16D 41/30* (2006.01)

(52) U.S. Cl.
  CPC .............. *B62L 1/005* (2013.01); *F16D 41/30* (2013.01); *B60B 2900/321* (2013.01); *B60B 2900/325* (2013.01); *B62K 2206/00* (2013.01)

(56) References Cited

U.S. PATENT DOCUMENTS

| | | |
|---|---|---|
| 4,175,404 A | 11/1979 | Schopf |
| 4,261,452 A | 4/1981 | Barrows |
| 4,473,317 A | 9/1984 | Bolang |
| 4,869,710 A | 9/1989 | Iwasaki |
| 5,448,944 A | 9/1995 | Line et al. |
| 5,480,357 A | 1/1996 | Liang |
| 5,503,494 A | 4/1996 | Kamata et al. |
| 5,664,655 A | 9/1997 | Oh |
| 5,697,850 A | 12/1997 | Yaegashi et al. |
| 5,704,859 A | 1/1998 | Feng et al. |
| 5,716,159 A | 2/1998 | Tomikawa |
| 5,738,603 A | 4/1998 | Schmidt et al. |
| 5,771,737 A | 6/1998 | Yaegashi |
| 5,851,152 A | 12/1998 | Ilzhofer et al. |
| 5,954,604 A | 9/1999 | Nakamura |
| 5,964,332 A | 10/1999 | King |
| 6,101,907 A | 8/2000 | McGovern et al. |
| 6,116,700 A | 9/2000 | Herrera |
| 6,322,158 B1 | 11/2001 | Herrera |
| 6,340,338 B1 | 1/2002 | Kamada |
| 6,382,381 B1 | 5/2002 | Okajima et al. |
| 6,428,437 B1 | 8/2002 | Schlanger |
| 6,488,603 B2 | 12/2002 | Lim et al. |
| 6,497,314 B2 | 12/2002 | Kanehisa |
| 6,587,741 B1 | 7/2003 | Chetta et al. |
| 6,644,452 B2 | 11/2003 | Lew et al. |
| 6,659,895 B2 | 12/2003 | Fukuda |
| 6,669,306 B1 | 12/2003 | Hara et al. |
| 6,866,604 B2 | 3/2005 | Kamada et al. |
| 6,923,741 B2 | 8/2005 | Wei |
| 6,958,026 B2 | 10/2005 | Wang et al. |
| 7,044,876 B2 | 5/2006 | Kamada et al. |
| 7,360,470 B2 | 4/2008 | Bonner |
| 7,475,758 B2 | 1/2009 | Dimsey et al. |
| 7,484,608 B2 | 2/2009 | Lew et al. |
| 7,651,172 B2 | 1/2010 | Meggiolan |
| 7,846,047 B2 | 12/2010 | Nakano et al. |
| 8,057,338 B2 | 11/2011 | Kamada |
| 8,197,371 B2 | 6/2012 | D'Alusio |
| 8,226,511 B2 | 7/2012 | Kamada |
| 8,375,827 B2 | 2/2013 | Kuroiwa et al. |
| 8,757,341 B2 | 6/2014 | Klieber |
| 8,820,852 B2 | 9/2014 | Van Hoek |
| 9,199,509 B2 | 12/2015 | Koshiyama |
| 9,334,910 B2 | 5/2016 | Watarai |
| 9,669,656 B2 | 6/2017 | Lim et al. |
| 9,855,794 B1 | 1/2018 | Nakajima et al. |
| 10,377,174 B2 | 8/2019 | Fujita et al. |
| 10,507,690 B2 | 12/2019 | Fujita et al. |
| 10,752,320 B2 | 8/2020 | Oka |
| 11,179,967 B2 * | 11/2021 | Fujita .................... B60B 27/023 |
| 11,279,442 B2 | 3/2022 | Oka |
| 2001/0039224 A1 | 11/2001 | Lim et al. |
| 2001/0045140 A1 | 11/2001 | Kamminga et al. |
| 2002/0070604 A1 | 6/2002 | Kanehisa |
| 2002/0072446 A1 | 6/2002 | Kanehisa et al. |
| 2002/0074853 A1 | 6/2002 | Krampera |
| 2002/0086753 A1 | 7/2002 | Yahata |
| 2003/0040371 A1 | 2/2003 | Glowacki et al. |
| 2004/0142782 A1 | 7/2004 | Kamada et al. |
| 2005/0139444 A1 | 6/2005 | Kanehisa et al. |
| 2005/0209033 A1 | 9/2005 | Ledvina et al. |
| 2005/0266949 A1 | 12/2005 | Kamada et al. |
| 2006/0014599 A1 | 1/2006 | Meggiolan |
| 2006/0058140 A1 | 3/2006 | Nakano et al. |
| 2006/0128511 A1 | 6/2006 | Oishi et al. |
| 2007/0049436 A1 | 3/2007 | Kamada |
| 2008/0004143 A1 | 1/2008 | Kanehisa et al. |
| 2008/0188336 A1 | 8/2008 | Tokuyama |
| 2009/0181779 A1 | 7/2009 | Wagner et al. |
| 2009/0215543 A1 | 8/2009 | Brissette |
| 2009/0252549 A1 | 10/2009 | Takeuchi et al. |
| 2009/0258740 A1 | 10/2009 | Valle |
| 2009/0317177 A1 | 12/2009 | Nakagawa et al. |
| 2010/0170762 A1 | 7/2010 | Schlanger |
| 2010/0239363 A1 | 9/2010 | Cerasi |
| 2010/0260544 A1 | 10/2010 | Chiang |
| 2010/0303537 A1 | 12/2010 | Brown et al. |
| 2011/0020078 A1 | 1/2011 | Katsuki |
| 2011/0092327 A1 | 4/2011 | Oishi |
| 2011/0120232 A1 | 5/2011 | Lassanske |
| 2011/0130233 A1 | 6/2011 | Tokuyama et al. |
| 2012/0028723 A1 | 2/2012 | Ando et al. |
| 2012/0225745 A1 | 9/2012 | Oishi et al. |
| 2012/0228922 A1 | 9/2012 | Spahr et al. |
| 2012/0244978 A1 | 9/2012 | Liao et al. |
| 2013/0049322 A1 | 2/2013 | Rose et al. |
| 2013/0184109 A1 | 7/2013 | Van Hoek |
| 2013/0192419 A1 | 8/2013 | Mizuno et al. |
| 2013/0324354 A1 | 12/2013 | Phebus et al. |
| 2014/0074348 A1* | 3/2014 | Kitamura .................. B62M 6/50 701/33.1 |
| 2014/0193195 A1 | 7/2014 | Merz |
| 2014/0265539 A1 | 9/2014 | Thompson |
| 2015/0024884 A1 | 1/2015 | Braedt et al. |
| 2015/0125269 A1 | 5/2015 | Bois et al. |
| 2015/0202919 A1 | 7/2015 | Koshiyama |
| 2015/0203173 A1 | 7/2015 | Nishimoto et al. |
| 2015/0210353 A1 | 7/2015 | Tokuyama et al. |
| 2015/0308542 A1 | 10/2015 | Fukumori et al. |
| 2015/0311954 A1* | 10/2015 | Tetsuka .................... H02J 50/10 307/104 |
| 2015/0314641 A1 | 11/2015 | Koshiyama |
| 2016/0059930 A1 | 3/2016 | Fukunaga |
| 2016/0059931 A1 | 3/2016 | Fukunaga |
| 2016/0083045 A1 | 3/2016 | Lin |
| 2016/0096589 A1 | 4/2016 | Sato |
| 2016/0121965 A1 | 5/2016 | Tsai et al. |
| 2016/0167737 A1 | 6/2016 | Tokuyama et al. |
| 2016/0176477 A1 | 6/2016 | Bernardele |
| 2016/0200395 A1 | 7/2016 | Braedt |
| 2016/0223033 A1 | 8/2016 | Fujita et al. |
| 2016/0272002 A1 | 9/2016 | Earle et al. |
| 2016/0280326 A1 | 9/2016 | Braedt et al. |
| 2016/0297465 A1 | 10/2016 | Miyawaki et al. |
| 2016/0347410 A1 | 12/2016 | Watarai et al. |
| 2016/0368318 A1 | 12/2016 | Van Druten et al. |
| 2017/0036690 A1 | 2/2017 | Jager et al. |
| 2017/0057598 A1 | 3/2017 | Thrash et al. |
| 2017/0096029 A1 | 4/2017 | Fujita et al. |
| 2017/0355226 A1 | 12/2017 | Cheng et al. |
| 2017/0356502 A1 | 12/2017 | Cheng et al. |
| 2018/0304965 A1 | 10/2018 | Fukumori |

FOREIGN PATENT DOCUMENTS

| | | |
|---|---|---|
| CN | 1746071 | 3/2006 |
| CN | 102653306 | 9/2012 |
| CN | 202765219 U | 3/2013 |
| CN | 104802919 | 7/2015 |
| CN | 105015265 | 11/2015 |
| CN | 105041971 | 11/2015 |
| CN | 205499241 U | 8/2016 |
| CN | 105966543 | 9/2016 |
| CN | 106184594 | 12/2016 |
| CN | 106457892 | 2/2017 |
| CN | 106560329 | 4/2017 |
| CN | 108725684 | 11/2018 |

(56) References Cited

FOREIGN PATENT DOCUMENTS

| | | |
|---|---|---|
| DE | 60022250 T2 | 6/2006 |
| DE | 10 2015 005 141 | 11/2015 |
| DE | 202016100725 U1 | 4/2016 |
| DE | 10 2016 010 853 | 4/2017 |
| EP | 1043221 A2 | 10/2000 |
| EP | 2526011 B1 | 3/2014 |
| FR | 2571329 A1 * | 4/1986 |
| JP | 57-153092 U | 3/1982 |
| JP | 63-195991 U | 12/1988 |
| JP | 1-87993 U | 6/1989 |
| JP | 07-32803 | 2/1995 |
| JP | 10-181668 | 7/1998 |
| JP | 2000-314438 | 11/2000 |
| JP | 2002-104262 | 4/2002 |
| JP | 2002-192903 | 7/2002 |
| JP | 2002-193178 | 7/2002 |
| JP | 2002-205681 | 7/2002 |
| JP | 2002-531315 | 9/2002 |
| JP | 2004-090914 | 3/2004 |
| JP | 2004-142739 | 5/2004 |
| JP | 2005-186763 | 7/2005 |
| JP | 2006-168720 | 6/2006 |
| JP | 2008-175277 | 7/2008 |
| JP | 2009-293789 | 12/2009 |
| JP | 2011-500436 | 1/2011 |
| JP | 2015-092096 | 5/2015 |
| JP | 2016-117479 | 6/2016 |
| TW | 533143 B | 5/2003 |
| TW | 200609151 | 3/2006 |
| TW | M362767 U1 | 8/2009 |
| TW | 201529362 | 8/2015 |
| WO | WO 2017/011189 | 1/2017 |

OTHER PUBLICATIONS

Maeda Industries, Ltd., "Suntour", https://farm6.staticflickr.com/5263/5661348533_d602655f4b_b.jpg, Jun. 1991 (Year: 1991).*
Equusbicycle, "Microlite", https://equusbicycle.com/bike/suntour/catalog92/pdf/Suntour1992%20-%200005.pdf, 1992. (Year: 1992).*
RetroBike, "SunTour XC Pro rear hub sizing help please", https://www.retrobike.co.uk/threads/suntour-xc-pro-rear-hub-sizing-help-please.232440/, p. 1, Nov. 30, 2012 (Year: 2012).*
Office Action with Form PTO-892 Notice of References Cited issued by the United States Patent and Trademark Office for the co-pending U.S. Appl. No. 15/686,179, May 10, 2021.
Office Action issued by the United States Patent and Trademark Office for the co-pending U.S. Appl. No. 16/008,031, May 3, 2021.
Office Action with Form PTO-892 Notice of References Cited issued by the United States Patent and Trademark Office for the co-pending U.S. Appl. No. 16/008,031, May 11, 2021.
"Key and Splines", Ed. Trignet, Chinese Program Press, First Edition, Aug. 31, 2004, pp. 77-79.
Office Action issued by the United States Patent and Trademark Office for the co-pending U.S. Appl. No. 15/608,924, May 15, 2019.
B1 Machine element design, tribology, JSME mechanical engineers' handbook, Apr. 15, 1996, The Japan Society of Mechanical Engineers.
Norton, Robert L. 2013, Machine Design An Integrated Approach 5th Edition, Pearson.
Jones, Franklin et al., 1998, Machinerys Handbook, New York, NY Industrial Press, Inc.
Robert L. Norton, Machine Design, An Integrated Approach, Third Edition, Prentice Hall, 2006, pp. 532, 533, 643-645 (Year: 2006).
Office Action issued by the United States Patent and Trademark Office for the co-pending U.S. Appl. No. 15/686,177, Aug. 21, 2019.
Office Action issued by the United States Patent and Trademark Office for the co-pending U.S. Appl. No. 15/686,179, Aug. 21, 2019.
Office Action issued by the United States Patent and Trademark Office for the co-pending U.S. Appl. No. 15/608,915, Jul. 16, 2019.
Third-Party Submissions under 37 CFR 1.290 Concise Description of Relevance submitted in U.S. Appl. No. 15/608,915, notified to Applicant on Jul. 3, 2019.
Third-Party Submissions under 37 CFR 1.290 Concise Description of Relevance submitted in U.S. Appl. No. 15/608,915, notified to Applicant on Jul. 18, 2019.
Third-Party Submissions under 37 CFR 1.290 Concise Description of Relevance submitted in U.S. Appl. No. 15/686,177, notified to Applicant on Jul. 23, 2019.
Office Action issued by the United States Patent and Trademark Office for the co-pending U.S. Appl. No. 15/608,924, Sep. 26, 2019.
Office Action issued by the United States Patent and Trademark Office for the co-pending U.S. Appl. No. 15/851,785, Nov. 7, 2019.
Office Action issued by the U.S. Patent and Trademark Office for the U.S. Appl. No. 15/686,179, Dec. 12, 2019.
Office Action issued by the U.S. Patent and Trademark Office for the U.S. Appl. No. 15/608,915, Jan. 8, 2020.
Office Action with PTO-892 issued by the U.S. Patent and Trademark Office for the U.S. Appl. No. 15/686,177, Feb. 20, 2020.
Zee Rear Freehub for Disc Brake, Model No. FH-M645, https://web.archive.org/web/20150905181629/http://bike.shimano.com/content/sac-bike/en/home/mtb1/wheels---hubs/rear-hubs/fh-m645.html, Sep. 5, 2015. (Year: 2015) (Year: 2015).
Office Action issued by the U.S. Patent and Trademark Office for the U.S. Appl. No. 15/686,179, Mar. 19, 2020.
Office Action issued by the U.S. Patent and Trademark Office for the U.S. Appl. No. 15/608,915, Apr. 7, 2020.
Office Action with Form PTO-892 Notice of References Cited issued by the U.S. Patent and Trademark Office for the U.S. Appl. No. 15/851,781, Apr. 20, 2020.
Office Action issued by the U.S. Patent and Trademark Office for the U.S. Appl. No. 15/608,924, Apr. 22, 2020.
Office Action issued by the U.S. Patent and Trademark Office for the U.S. Appl. No. 15/608,915, Jun. 10, 2020.
Office Action issued by the U.S. Patent and Trademark Office for the U.S. Appl. No. 15/686,177, Jun. 11, 2020.
Office Action with Form PTO-892 Notice of References Cited issued by the United States Patent and Trademark Office for the U.S. Appl. No. 15/686,179, Jul. 16, 2020.
Office Action with Form PTO-892 Notice of References Cited issued by the United States Patent and Trademark Office for the U.S. Appl. No. 15/851,781, Aug. 4, 2020.
Office Action issued by the United States Patent and Trademark Office for the co-pending U.S. Appl. No. 15/608,924, Sep. 2, 2020.
Office Action issued by the United States Patent and Trademark Office for the parent U.S. Appl. No. 15/608,915, Sep. 25, 2020.
Office Action issued by the United States Patent and Trademark Office for the co-pending U.S. Appl. No. 15/686,177, Sep. 25, 2020.
Office Action issued by the United States Patent and Trademark Office for the co-pending U.S. Appl. No. 15/686,177, Oct. 16, 2020.
Office Action issued by the United States Patent and Trademark Office for the co-pending U.S. Appl. No. 16/008,031, Oct. 16, 2020.
Office Action with Form PTO-892 Notice of References Cited issued by the United States Patent and Trademark Office for the co-pending U.S. Appl. No. 15/686,179, Oct. 28, 2020.
Office Action issued by the United States Patent and Trademark Office for the co-pending U.S. Appl. No. 15/608,924, Nov. 19, 2020.
Office Action issued by the United States Patent and Trademark Office for the parent U.S. Appl. No. 15/608,915, Dec. 8, 2020.
Office Action with Form PTO-892 Notice of References Cited issued by the United States Patent and Trademark Office for the parent U.S. Appl. No. 15/608,915, Dec. 30, 2020.
Office Action with Form PTO-892 Notice of References Cited issued by the United States Patent and Trademark Office for the co-pending U.S. Appl. No. 15/686,179, Jan. 19, 2021.
Office Action issued by the United States Patent and Trademark Office for the co-pending U.S. Appl. No. 15/686,177, Jan. 21, 2021.
Office Action issued by the United States Patent and Trademark Office for the co-pending U.S. Appl. No. 16/008,031, Feb. 5, 2021.
Office Action with Form PTO-892 Notice of References Cited issued by the United States Patent and Trademark Office for the co-pending U.S. Appl. No. 15/608,924, Mar. 17, 2021.
Office Action issued by the United States Patent and Trademark Office for the co-pending U.S. Appl. No. 15/686,177, Apr. 8, 2021.
Office Action issued by the United States Patent and Trademark Office for the co-pending U.S. Appl. No. 15/686,177, Apr. 22, 2021.

(56) References Cited

OTHER PUBLICATIONS

Office Action issued by the U.S. Patent and Trademark Office for the U.S. Appl. No. 16/145,116, Jan. 29, 2019.
Office Action issued by the United States Patent and Trademark Office for the co-pending U.S. Appl. No. 16/145,116, Jul. 16, 2019.
Office Action issued by the U.S. Patent and Trademark Office for the U.S. Appl. No. 16/145,116, Jan. 6, 2020.
Office Action issued by the U.S. Patent and Trademark Office for the U.S. Appl. No. 16/145,116, Jun. 10, 2020.
Office Action issued by the United States Patent and Trademark Office for the co-pending U.S. Appl. No. 16/145,116, Sep. 25, 2020.
Office Action issued by the United States Patent and Trademark Office for the co-pending U.S. Appl. No. 16/145,116, Oct. 13, 2020.
Office Action issued by the United States Patent and Trademark Office for the co-pending U.S. Appl. No. 16/145,116, Jan. 21, 2021.
Office Action issued by the United States Patent and Trademark Office for the co-pending U.S. Appl. No. 16/145,116, Apr. 8, 2021.
Office Action issued by the United States Patent and Trademark Office for the co-pending U.S. Appl. No. 15/686,179, Aug. 12, 2021.
Office Action issued by the United States Patent and Trademark Office for the co-pending U.S. Appl. No. 16/008,031, Aug. 12, 2021.
Office Action with Form PTO-892 Notice of References Cited issued by the United States Patent and Trademark Office for the co-pending U.S. Appl. No. 15/608,924, Jul. 29, 2021.
Office Action issued by the United States Patent and Trademark Office for the co-pending U.S. Appl. No. 15/608,924, Nov. 3, 2021.
Office Action with Form PTO-892 Notice of References Cited issued by the United States Patent and Trademark Office for the co-pending U.S. Appl. No. 17/665,598, Sep. 30, 2022.

* cited by examiner

SPROCKET SUPPORT BODY

CROSS-REFERENCE TO RELATED APPLICATIONS

The present application is a continuation application of the U.S. patent application Ser. No. 16/145,116 filed Sep. 27, 2018, which has been issued as U.S. Pat. No. 11,097,807, and which is a continuation application of the U.S. patent application Ser. No. 15/608,915 filed May 30, 2017, which has been issued as U.S. Pat. No. 11,059,541. The contents of this application are incorporated herein by reference in their entirety.

BACKGROUND OF THE INVENTION

Field of the Invention

The present invention relates to a sprocket support body.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a hub assembly.

SUMMARY OF THE INVENTION

In accordance with a first aspect of the present invention, a sprocket support body is configured to be rotatably mounted on a hub axle of a bicycle hub assembly about a rotational center axis of the bicycle hub assembly. The sprocket support body comprises at least ten external spline teeth configured to engage with a bicycle rear sprocket assembly. Each of the at least ten external spline teeth has an external-spline driving surface and an external-spline non-driving surface. The al least ten external spline teeth include a plurality of external-spline driving surfaces to receive a driving rotational force from the bicycle rear sprocket assembly during pedaling. The plurality of external-spline driving surfaces each includes a radially outermost edge, a radially innermost edge, and a radial length defined from the radially outermost edge to the radially innermost edge. A total of the radial lengths of the plurality of external-spline driving surfaces is equal to or larger than 7 mm. At least one external-spline driving surface of the plurality of external-spline driving surfaces has a first external-spline-surface angle defined between the at least one external-spline driving surface of the plurality of external-spline driving surfaces and a first radial line extending from the rotational center axis to the radially outermost edge of the at least one external-spline driving surface of the plurality of external-spline driving surfaces. The first external-spline-surface angle ranges from 0 degree to 10 degrees. One tooth of the at least ten external spline teeth having a first circumferential spline size. The other teeth of the at least ten external spline teeth each have a second circumferential spline size that is smaller than the first circumferential spline size. A total number of the other teeth of the at least ten external spline teeth being equal to or larger than nine.

With the bicycle hub assembly according to the first aspect, the at least ten external spline teeth reduce a rotational force applied to each of the at least ten external spline teeth in comparison with a sprocket support body including nine or less external spline teeth. This improves durability of the sprocket support body and/or improves a degree of freedom of choosing a material of the sprocket support body without reducing durability of the sprocket support body. It is also possible to increase the radial lengths of the plurality of external-spline driving surface. This improves strength of the sprocket support body.

In accordance with a second aspect of the present invention, the bicycle hub assembly according to the first aspect is configured so that a total number of the at least ten external spline teeth is equal to or larger than 20.

With the bicycle hub assembly according to the second aspect, the at least twenty external spline teeth further reduce the rotational force applied to each of the at least twenty external spline teeth in comparison with a sprocket support body including nine or less external spline teeth. This further improves durability of the sprocket support body and/or improves a degree of freedom of choosing a material of the sprocket support body without reducing durability of the sprocket support body.

In accordance with a third aspect of the present invention, the bicycle hub assembly according to the first aspect is configured so that the at least ten external spline teeth have a first external pitch angle and a second external pitch angle different from the first external pitch angle.

With the bicycle hub assembly according to the third aspect, the difference between the first external pitch angle and the second external pitch angle helps the user to correctly mount the bicycle rear sprocket assembly to the sprocket support body, especially concerning a circumferential position of each sprocket of the bicycle rear sprocket assembly.

In accordance with a fourth aspect of the present invention, the bicycle hub assembly according to the first aspect is configured so that at least one of the at least ten external spline teeth has a first spline shape different from a second spline shape of another of the at least ten external spline teeth.

With the bicycle hub assembly according to the fourth aspect, the difference between the first spline shape and the second spline shape helps the user to correctly mount the bicycle rear sprocket assembly to the sprocket support body, especially concerning a circumferential position of each sprocket of the bicycle rear sprocket assembly.

In accordance with a fifth aspect of the present invention, the bicycle hub assembly according to the first aspect is configured so that at least one of the at least ten external spline teeth has a first spline size different from a second spline size of another of the at least ten external spline teeth.

With the bicycle hub assembly according to the fifth aspect, the difference between the first spline size and the second spline size helps the user to correctly mount the bicycle rear sprocket assembly to the sprocket support body, especially concerning a circumferential position of each sprocket of the bicycle rear sprocket assembly.

In accordance with a sixth aspect of the present invention, the bicycle hub assembly according to the first aspect is configured so that at least two external spline teeth of the at least ten external spline teeth are circumferentially arranged at a first external pitch angle with respect to a rotational center axis of the bicycle hub assembly. The first external pitch angle ranges from 10 degrees to 20 degrees.

With the bicycle hub assembly according to the sixth aspect, the first external pitch angle reduces a rotational force applied to each of the at least two external spline teeth in comparison with a sprocket support body having an external pitch angle larger than the first external pitch angle. This improves durability of the sprocket support body and/or improves a degree of freedom of choosing a material of the sprocket support body without reducing durability of the sprocket support body.

In accordance with a seventh aspect of the present invention, the bicycle hub assembly according to the sixth aspect is configured so that the first external pitch angle ranges from 12 degrees to 15 degrees.

With the bicycle hub assembly according to the seventh aspect, the first external pitch angle further reduces a rotational force applied to each of the at least two external spline teeth in comparison with a sprocket support body having an external pitch angle larger than the first external pitch angle. This further improves durability of the sprocket support body and/or improves a degree of freedom of choosing a material of the sprocket support body without reducing durability of the sprocket support body.

In accordance with an eighth aspect of the present invention, the bicycle hub assembly according to the sixth aspect is configured so that at least two external spline teeth of the plurality of external spline teeth are circumferentially arranged at a second external pitch angle with respect to the rotational center axis of the bicycle hub assembly. The second external pitch angle is different from the first external pitch angle.

With the bicycle hub assembly according to the eighth aspect, the difference between the first external pitch angle and the second external pitch angle helps the user to correctly mount the bicycle rear sprocket assembly to the sprocket support body, especially concerning a circumferential position of each sprocket of the bicycle rear sprocket assembly.

In accordance with a ninth aspect of the present invention, the bicycle hub assembly according to the first aspect is configured so that the total of the radial lengths is equal to or larger than 10 mm.

With the bicycle hub assembly according to the tenth aspect, it is possible to further increase the radial lengths of the plurality of external-spline driving surface. This further improves strength of the sprocket support body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
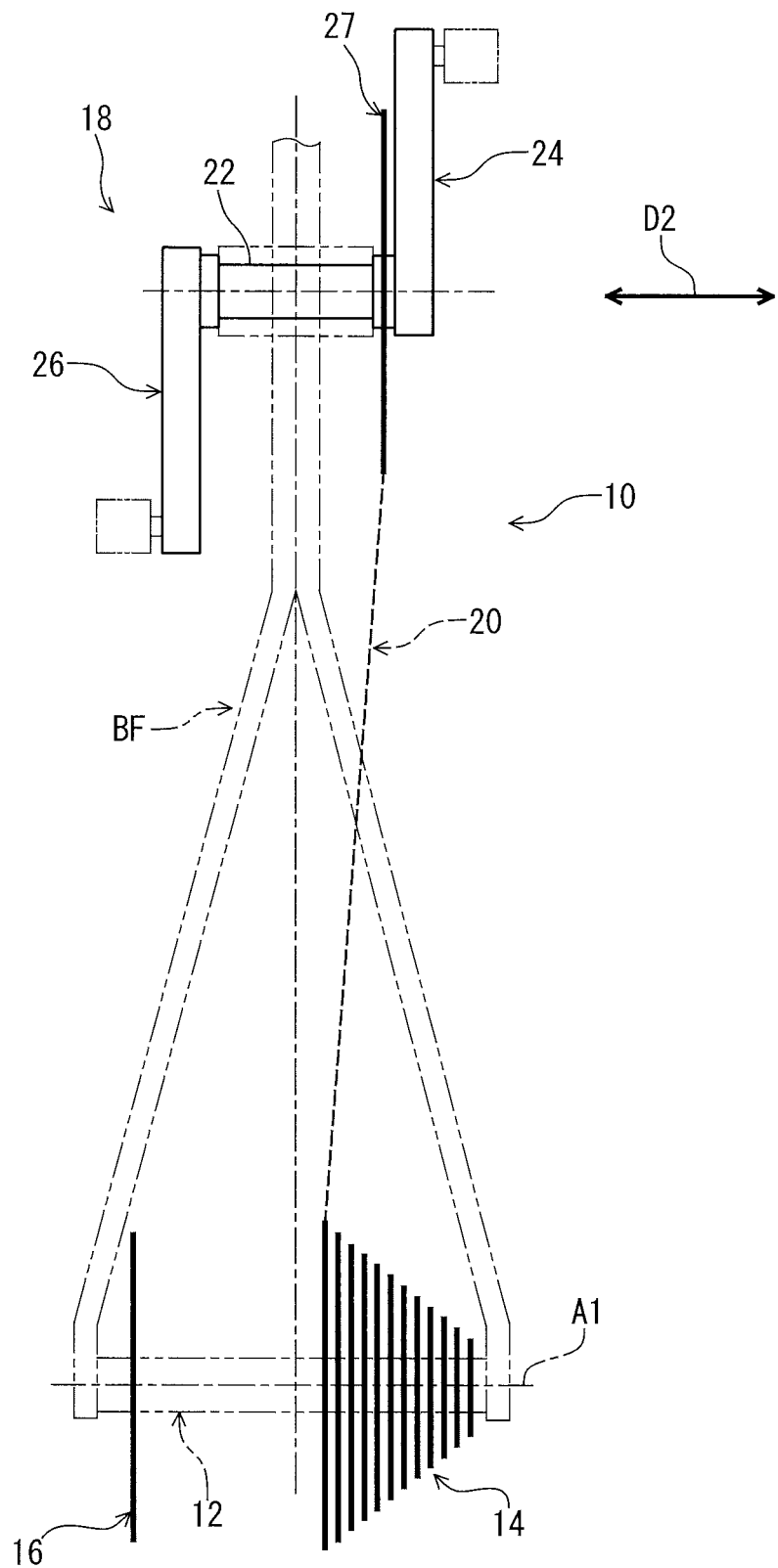
FIG. 1 is a schematic diagram of a bicycle drive train in accordance with an embodiment.

The embodiment(s) will now be described with reference to the accompanying drawings, wherein like reference numerals designate corresponding or identical elements throughout the various drawings.

Referring initially to FIG. 1, a bicycle drive train 10 in accordance with an embodiment comprises a bicycle hub assembly 12 and a bicycle rear sprocket assembly 14. The bicycle hub assembly 12 is secured to a bicycle frame BF.

The bicycle rear sprocket assembly 14 is mounted on the bicycle hub assembly 12. A bicycle brake rotor 16 is mounted on the bicycle hub assembly 12.

The bicycle drive train 10 further comprises a crank assembly 18 and a bicycle chain 20. The crank assembly 18 includes a crank axle 22, a right crank arm 24, a left crank arm 26, and a front sprocket 27. The right crank arm 24 and the left crank arm 26 are secured to the crank axle 22. The front sprocket 27 is secured to at least one of the crank axle 22 and the right crank arm 24. The bicycle chain 20 is engaged with the front sprocket 27 and the bicycle rear sprocket assembly 14 to transmit a pedaling force from the front sprocket 27 to the bicycle rear sprocket assembly 14. The crank assembly 18 includes the front sprocket 27 as a single sprocket in the illustrated embodiment. However, the crank assembly 18 can include a plurality of front sprockets. The bicycle rear sprocket assembly 14 is a rear sprocket assembly. However, structures of the bicycle rear sprocket assembly 14 can be applied to the front sprocket.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle drive train 10, the bicycle hub assembly 12, or the bicycle rear sprocket assembly 14, should be interpreted relative to the bicycle equipped with the bicycle drive train 10, the bicycle hub assembly 12, or the bicycle rear sprocket assembly 14 as used in an upright riding position on a horizontal surface.

Figure 2:
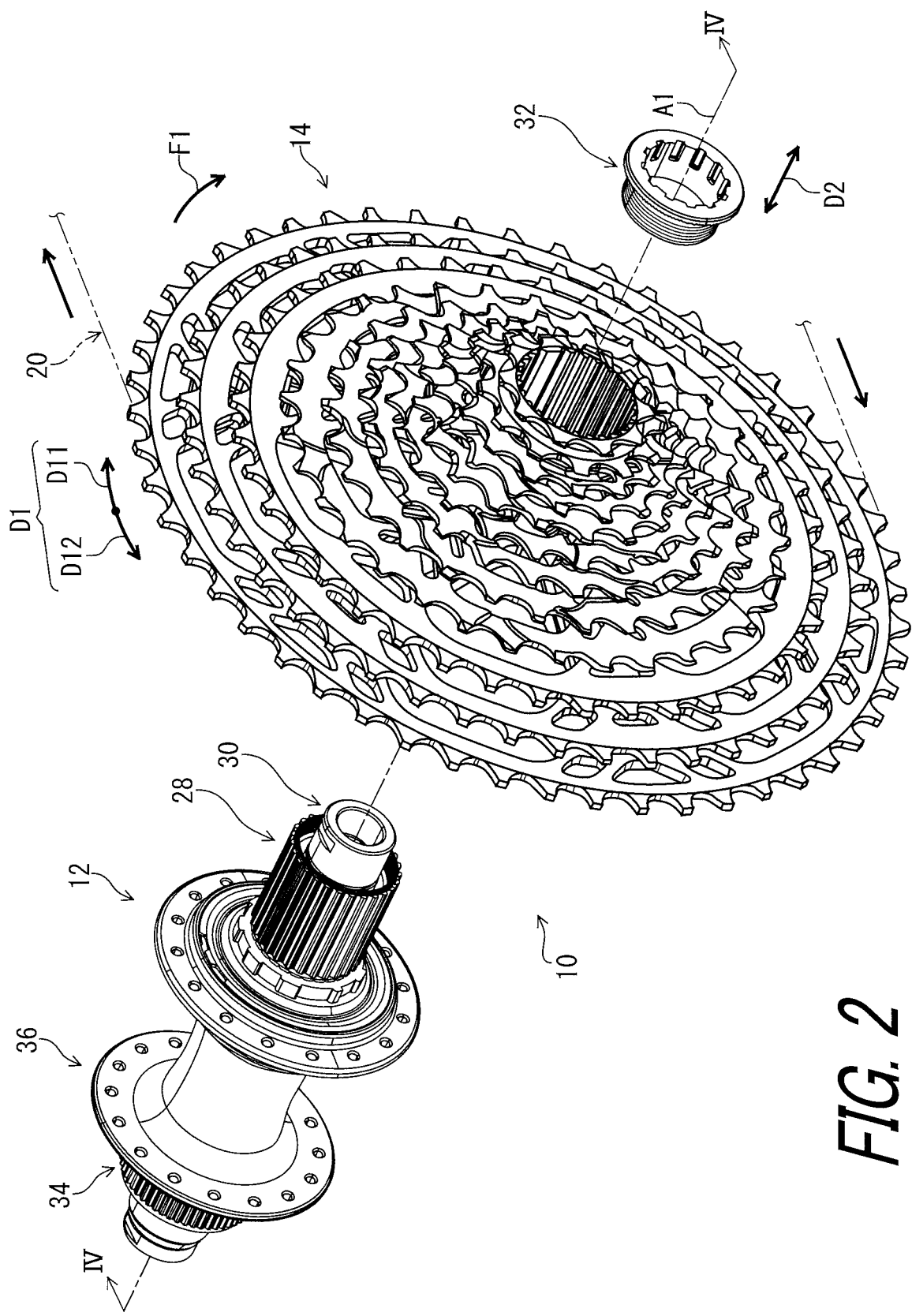
FIG. 2 is an exploded perspective view of the bicycle drive train illustrated in FIG. 1.
Figure 3:
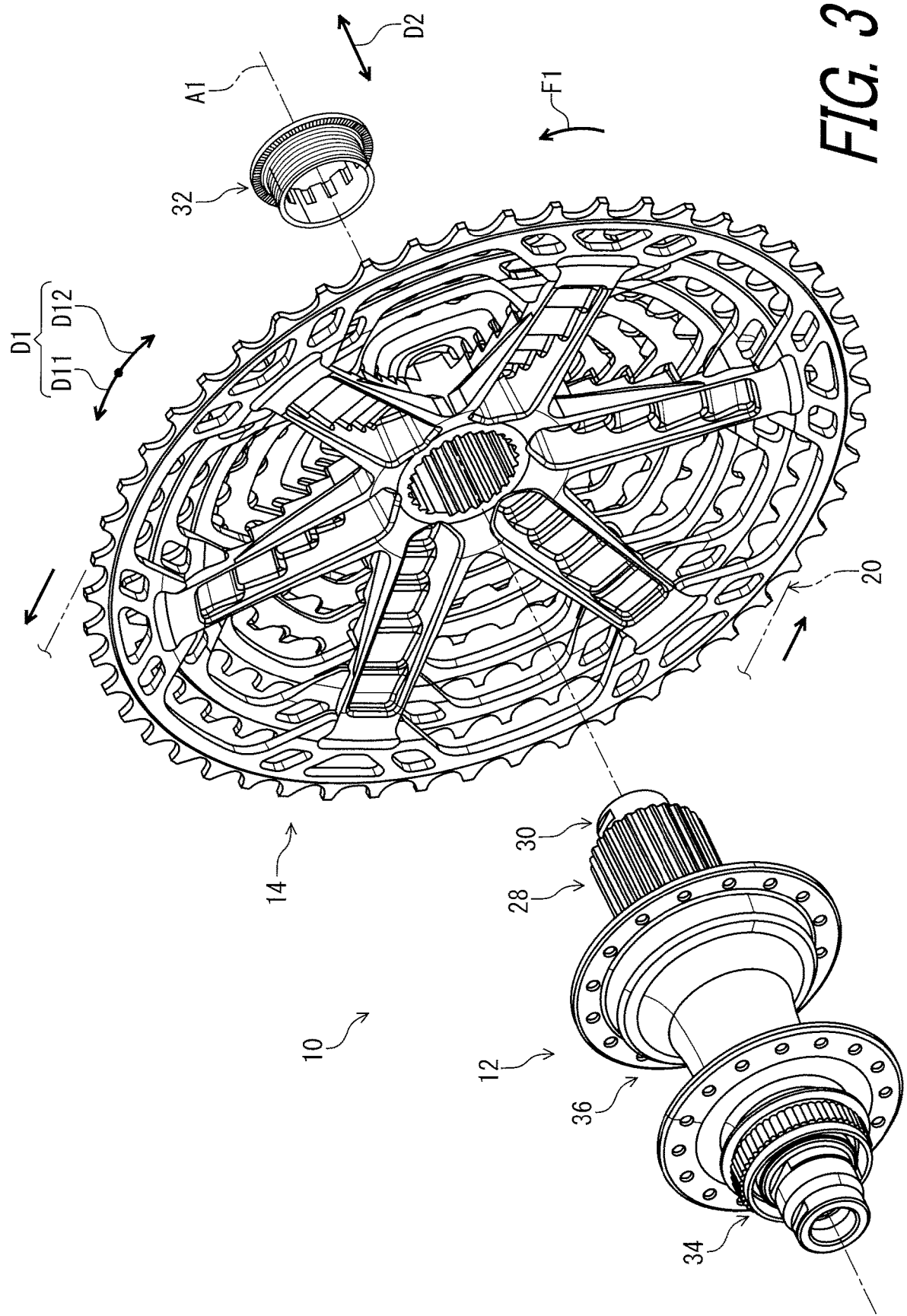
FIG. 3 is another perspective view of the bicycle drive train illustrated in FIG. 2.

As seen in FIGS. 2 and 3, the bicycle hub assembly 12 and the bicycle rear sprocket assembly 14 have a rotational center axis A1. The bicycle rear sprocket assembly 14 is rotatably supported by the bicycle hub assembly 12 relative to the bicycle frame BF (FIG. 1) about the rotational center axis A1. The bicycle rear sprocket assembly 14 is configured to be engaged with the bicycle chain 20 to transmit a driving rotational force F1 between the bicycle chain 20 and the bicycle rear sprocket assembly 14 during pedaling. The bicycle rear sprocket assembly 14 is rotated about the rotational center axis A1 in a driving rotational direction D11 during pedaling. The driving rotational direction D11 is defined along a circumferential direction D1 of the bicycle hub assembly 12 or the bicycle rear sprocket assembly 14. A reverse rotational direction D12 is an opposite direction of the driving rotational direction D11 and is defined along the circumferential direction D1.

As seen in FIG. 2, the bicycle hub assembly 12 comprises a sprocket support body 28. The bicycle rear sprocket assembly 14 is mounted on the sprocket support body 28 to transmit the driving rotational force F1 between the sprocket support body 28 and the bicycle rear sprocket assembly 14. The bicycle hub assembly 12 further comprises a hub axle 30. The sprocket support body 28 is rotatably mounted on the hub axle 30 about the rotational center axis A1. The bicycle hub assembly 12 comprises a lock ring 32. The lock ring 32 is secured to the sprocket support body 28 to hold the bicycle rear sprocket assembly 14 relative to the sprocket support body 28 in an axial direction D2 parallel to the rotational center axis A1.

Figure 4:
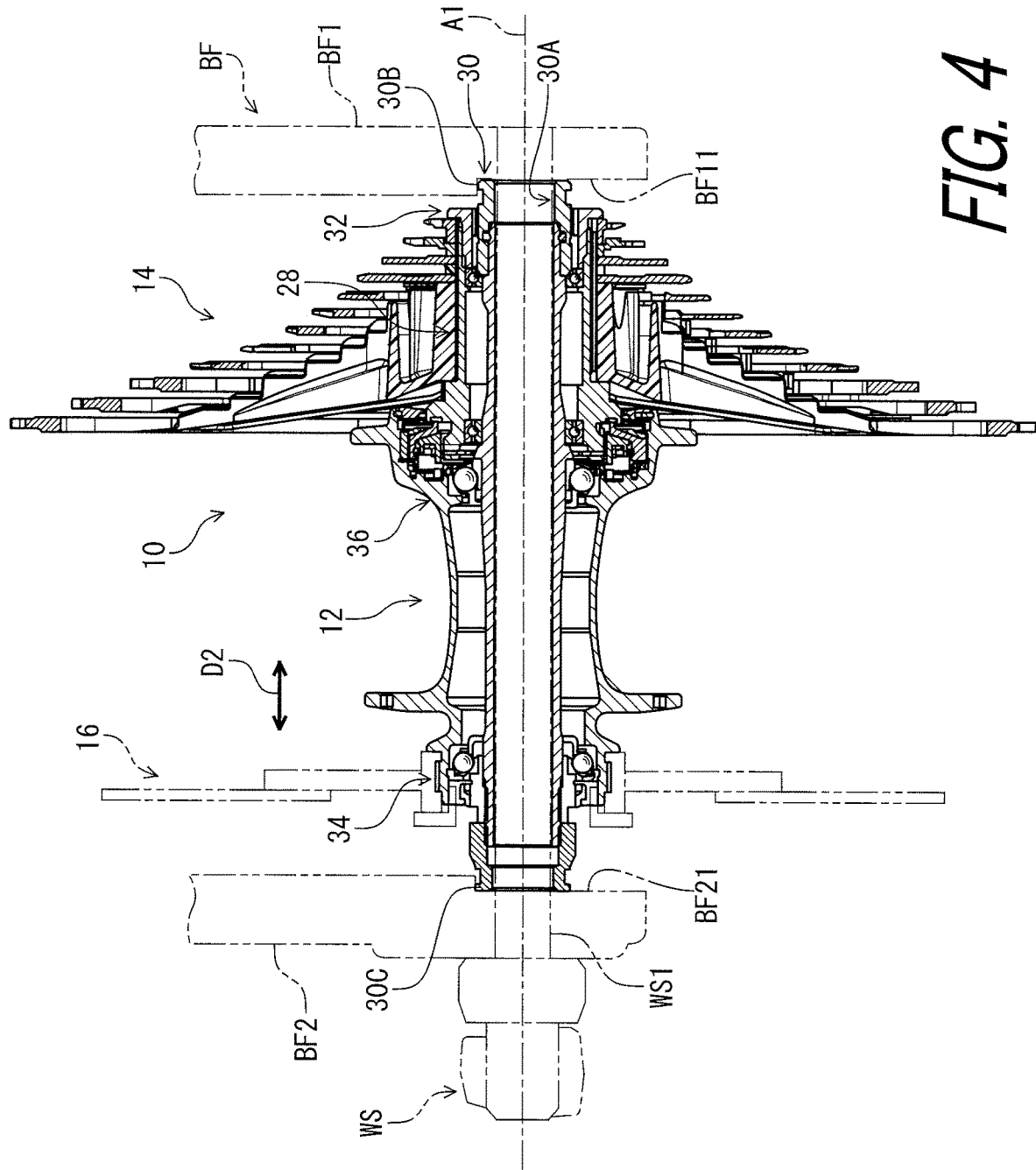
FIG. 4 is a cross-sectional view of the bicycle drive train taken along line IV-IV of FIG. 2.

As seen in FIG. 4, the bicycle hub assembly 12 is secured to the bicycle frame BF with a wheel securing structure WS. The hub axle 30 has a through hole 30A. A securing rod WS1 of the wheel securing structure WS extends through the through hole 30A of the hub axle 30. The hub axle 30 includes a first axle end 30B and a second axle end 30C. The hub axle 30 extends between the first axle end 30B and the second axle end 30C along the rotational center axis A1. The first axle end 30B is provided in a first recess BF11 of a first frame BF1 of the bicycle frame BF. The second axle end 30C is provided in a second recess BF21 of a second frame BF2 of the bicycle frame BF. The hub axle 30 is held between the first frame BF1 and the second frame BF2 with the wheel securing structure WS. The wheel securing structure WS includes a structure which has been known in the bicycle filed. Thus, it will not be described in detail here for the sake of brevity.

Figure 5:
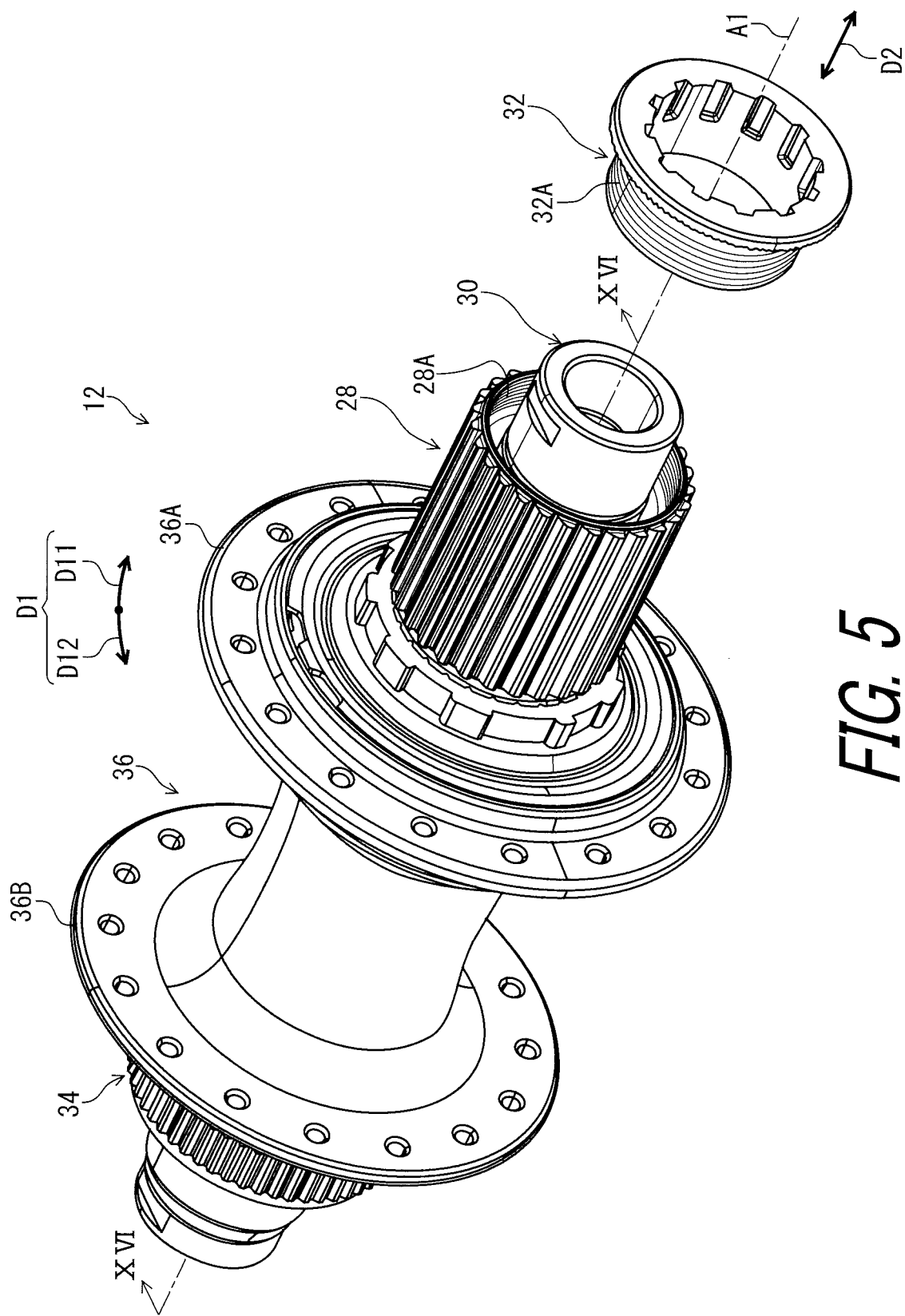
FIG. 5 is an exploded perspective view of a bicycle hub assembly of the bicycle drive train illustrated in FIG. 2.

As seen in FIGS. 4 and 5, the bicycle hub assembly 12 further comprises a brake-rotor support body 34. The brake-rotor support body 34 is rotatably mounted on the hub axle 30 about the rotational center axis A1. The brake-rotor support body 34 is coupled to the bicycle brake rotor 16 (FIG. 1) to transmit a braking rotational force from the bicycle brake rotor 16 to the brake-rotor support body 34.

As seen in FIG. 5, the bicycle hub assembly 12 further comprises a hub body 36. The hub body 36 is rotatably mounted on the hub axle 30 about the rotational center axis A1. In this embodiment, the sprocket support body 28 is a separate member from the hub body 36. The brake-rotor support body 34 is integrally provided with the hub body 36 as a one-piece unitary member. However, the sprocket support body 28 can be integrally provided with the hub body 36. The brake-rotor support body 34 can be a separate member from the hub body 36.

The hub body 36 includes a first flange 36A and a second flange 36B. First spokes (not shown) are coupled to the first flange 36A. Second spokes (not shown) are coupled to the second flange 36B. The second flange 36B is spaced apart from the first flange 36A in the axial direction D2. The first flange 36A is provided between the sprocket support body 28 and the second flange 36B in the axial direction D2. The second flange 36B is provided between the first flange 36A and the brake-rotor support body 34 in the axial direction D2.

The lock ring 32 includes an externally threaded part 32A. The sprocket support body 28 includes an internally threaded part 28A. The externally threaded part 32A is threadedly engaged with the internally threaded part 28A in a state where the lock ring 32 is secured to the sprocket support body 28.

Figure 6:
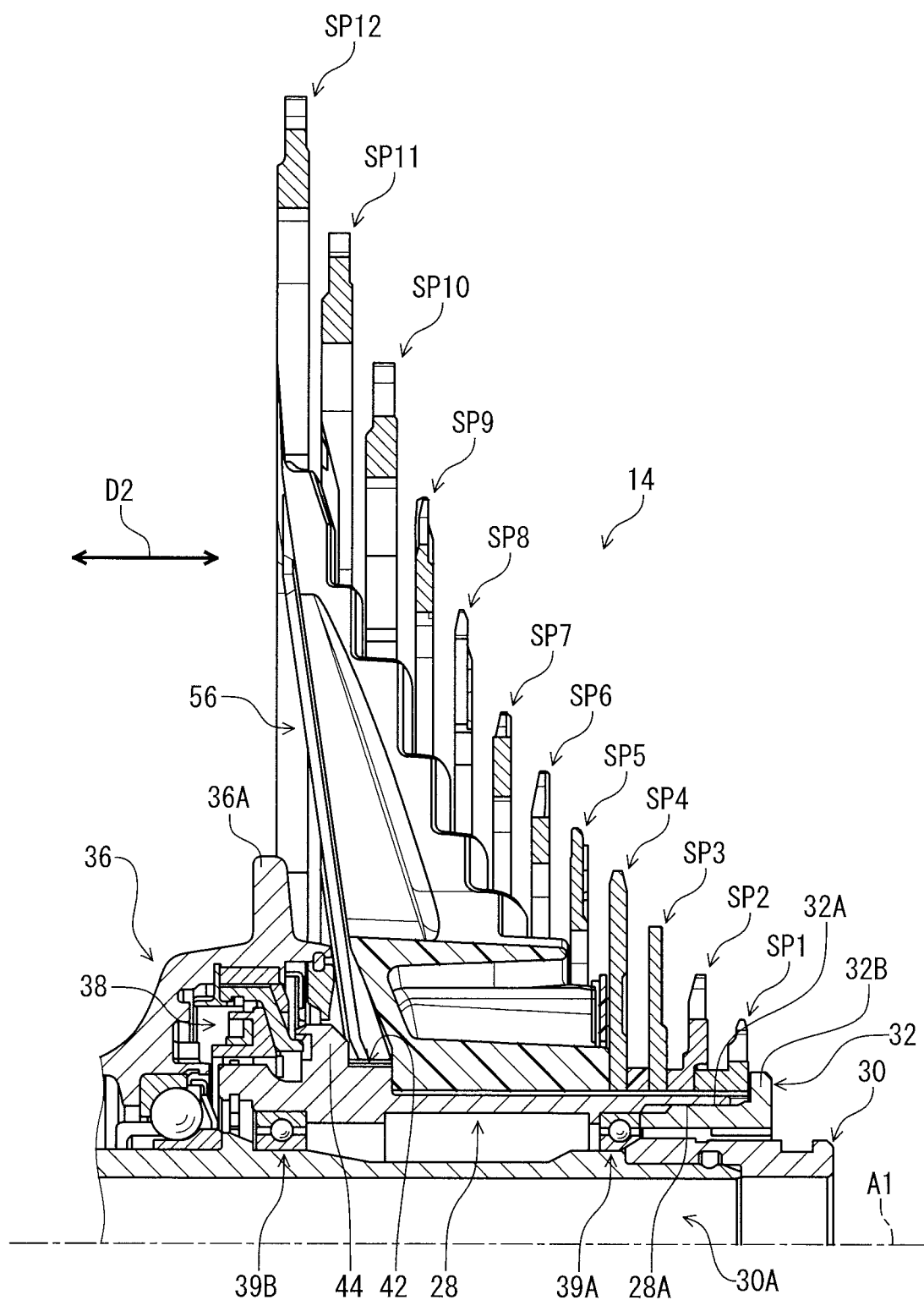
FIG. 6 is an enlarged cross-sectional view of the bicycle drive train illustrated in FIG. 4.

As seen in FIG. 6, the bicycle hub assembly 12 further comprises a ratchet structure 38. The sprocket support body 28 is operatively coupled to the hub body 36 with the ratchet structure 38. The ratchet structure 38 is configured to couple the sprocket support body 28 to the hub body 36 to rotate the sprocket support body 28 along with the hub body 36 in the driving rotational direction D11 (FIG. 5) during pedaling. The ratchet structure 38 is configured to allow the sprocket support body 28 to rotate relative to the hub body 36 in the reverse rotational direction D12 (FIG. 5) during coasting. Accordingly, the ratchet structure 38 may be paraphrased into a one-way clutch structure 38. The ratchet structure 38 includes structures which have been known in the bicycle field. Thus, they will not be described in detail here for the sake of brevity.

The bicycle hub assembly 12 includes a first bearing 39A and a second bearing 39B. The first bearing 39A and the second bearing 39B are provided between the sprocket support body 28 and the hub axle 30 to rotatably support the sprocket support body 28 relative to the hub axle 30 about the rotational center axis A1.

In this embodiment, each of the sprocket support body 28, the brake-rotor support body 34, and the hub body 36 is made of a metallic material such as aluminum, iron, or titanium. However, at least one of the sprocket support body 28, the brake-rotor support body 34, and the hub body 36 can be made of a non-metallic material.

Figure 7:
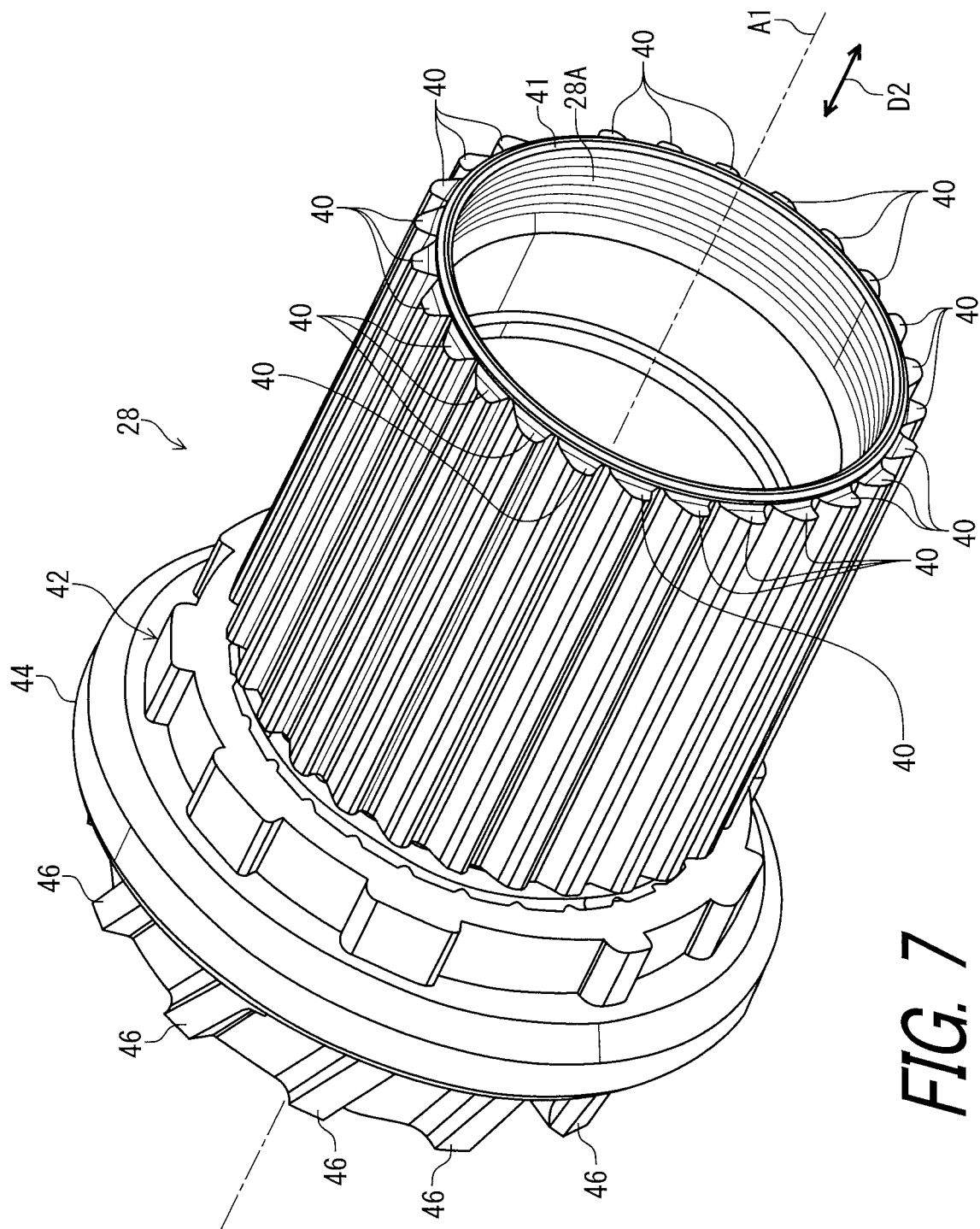
FIG. 7 is a perspective view of a sprocket support body of the bicycle hub assembly of the bicycle drive train illustrated in FIG. 2.
Figure 8:
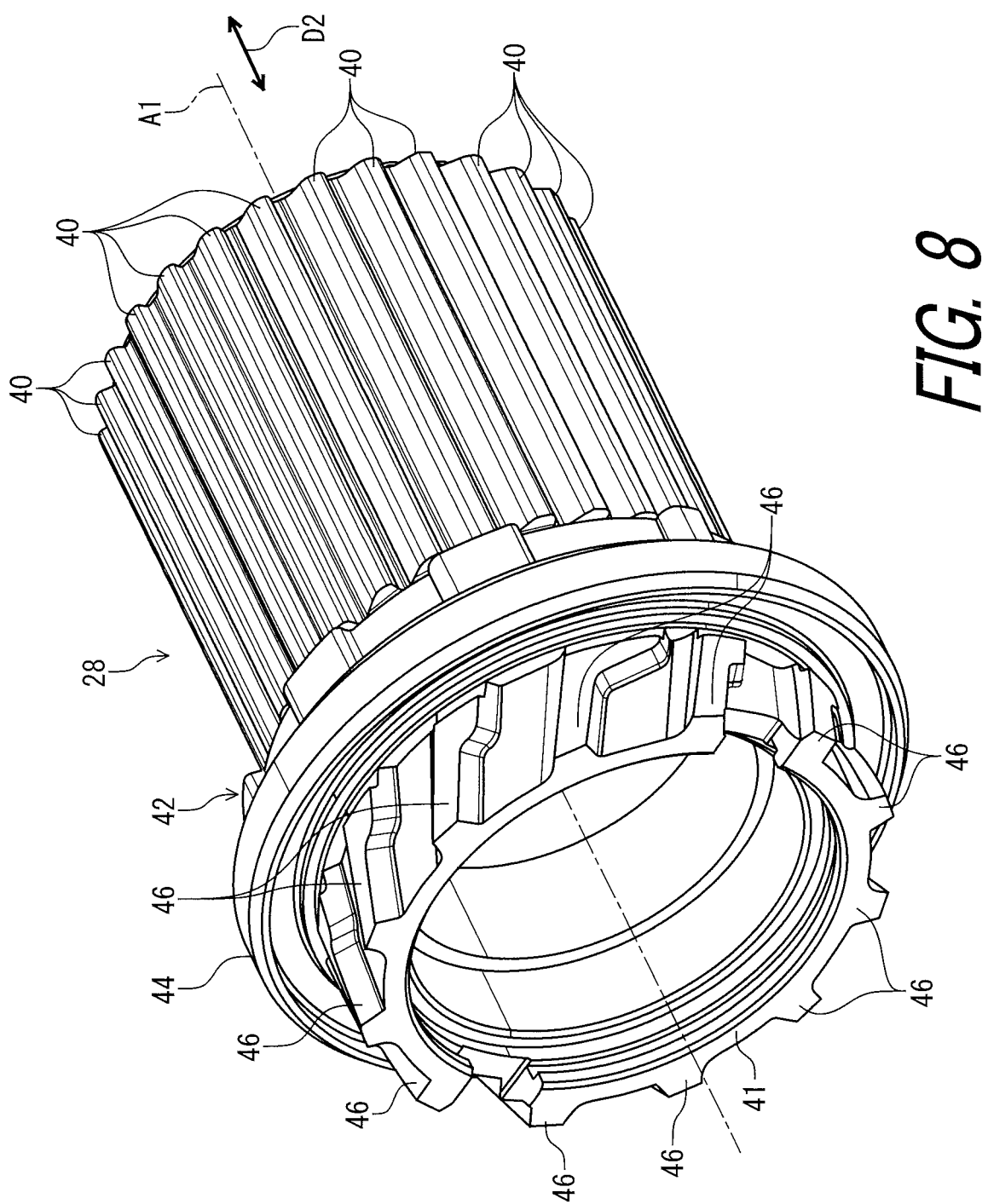
FIG. 8 is another perspective view of the sprocket support body of the bicycle hub assembly of the bicycle drive train illustrated in FIG. 2.

As seen in FIGS. 7 and 8, the sprocket support body 28 includes at least one external spline tooth 40 configured to engage with the bicycle rear sprocket assembly 14 (FIG. 6). The sprocket support body 28 includes a plurality of external spline teeth 40 configured to engage with the bicycle rear sprocket assembly 14 (FIG. 6). Namely, the at least one external spline tooth 40 includes a plurality of external spline teeth 40. The sprocket support body 28 includes at least nine external spline teeth 40 configured to engage with the bicycle rear sprocket assembly 14 (FIG. 6). The sprocket support body 28 includes at least ten external spline teeth 40 configured to engage with the bicycle rear sprocket assembly 14 (FIG. 6).

The sprocket support body 28 includes a base support 41 having a tubular shape. The base support 41 extends along the rotational center axis A1. The external spline tooth 40 extends radially outwardly from the base support 41. The sprocket support body 28 includes a larger-diameter part 42, a flange 44, and a plurality of helical external spline teeth 46. The larger-diameter part 42 and the flange 44 extend radially outwardly from the base support 41. The larger-diameter part 42 is provided between the plurality of external spline teeth 40 and the flange 44 in the axial direction D2. A groove 42a (see FIG. 15) is provided between the larger-diameter part 42 and the plurality of external spline teeth 40 in the axial direction D2. The larger-diameter part 42 and the flange 44 are provided between the plurality of external spline teeth 40 and the plurality of helical external spline teeth 46 in the axial direction D2. As seen in FIG. 6, the bicycle rear sprocket assembly 14 is held between the larger-diameter part 42 and a lock flange 32B of the lock ring 32 in the axial direction D2. The larger-diameter part 42 may have an interior cavity so that a drive structure such as a one-way clutch structure can be contained within the interior cavity. The larger-diameter part 42 can be omitted from the bicycle hub assembly 12 according to need.

Figure 9:
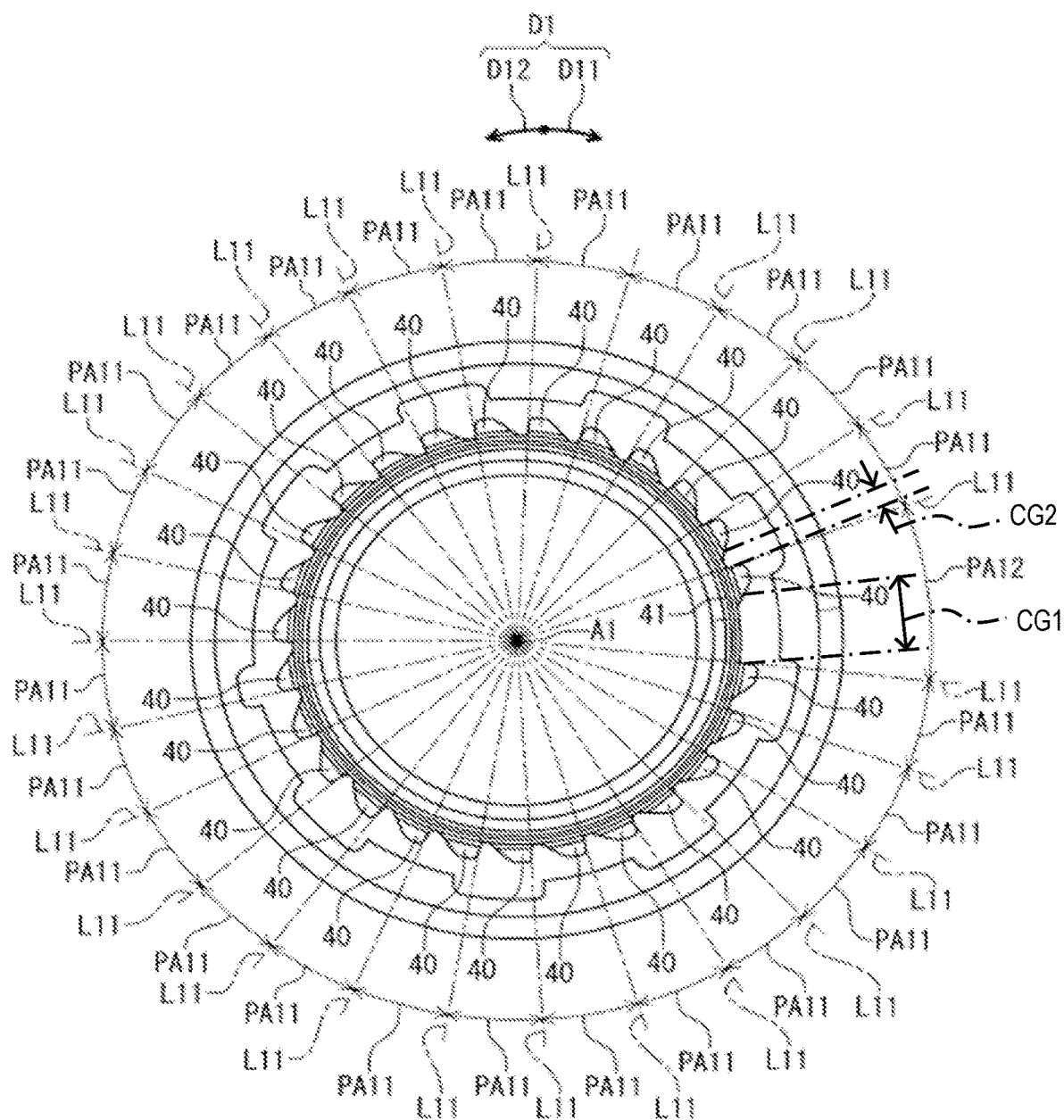
FIG. 9 is a side elevational view of the sprocket support body illustrated in FIG. 7.

As seen in FIG. 9, a total number of the at least ten external spline teeth 40 is equal to or larger than 20. As seen in FIGS. 7 and 8, a total number of the at least ten external spline teeth 40 being larger than a total number of the plurality of helical external spline teeth 46. The total number of the at least ten external spline teeth 40 is equal to or larger than 25. In this embodiment, the total number of the at least ten external spline teeth 40 is 26. However, a total number of the external spline teeth 40 is not limited to this embodiment and the above ranges.

The at least ten external spline teeth 40 have a first external pitch angle PA11 and a second external pitch angle PA12. At least two external spline teeth of the plurality of external spline teeth 40 are circumferentially arranged at the first external pitch angle PA11 with respect to the rotational center axis A1 of the bicycle hub assembly 12. At least two external spline teeth of the plurality of external spline teeth 40 are circumferentially arranged at the second external pitch angle PA12 with respect to the rotational center axis A1 of the bicycle hub assembly 12. In this embodiment, the second external pitch angle PA12 is different from the first external pitch angle PA11. However, the second external pitch angle PA12 can be substantially equal to the first external pitch angle PA11.

In this embodiment, the external spline teeth 40 are arranged at the first external pitch angle PA11 in the circumferential direction D1. Two external spline teeth of the external spline teeth 40 are arranged at the second external pitch angle PA12 in the circumferential direction D1. However, at least two external spline teeth of the external spline teeth 40 can be arranged at another external pitch angle in the circumferential direction D1.

The first external pitch angle PA11 ranges from 10 degrees to 20 degrees. The first external pitch angle PA11 ranges from 12 degrees to 15 degrees. The first external pitch angle PA11 ranges from 13 degrees to 14 degrees. In this embodiment, the first external pitch angle PA11 is 13.3 degrees. However, the first external pitch angle PA11 is not limited to this embodiment and the above ranges.

The second external pitch angle PA12 ranges from 5 degrees to 30 degrees. In this embodiment, the second external pitch angle PA12 is 26 degrees. However, the second external pitch angle PA12 is not limited to this embodiment and the above range.

Figure 10:
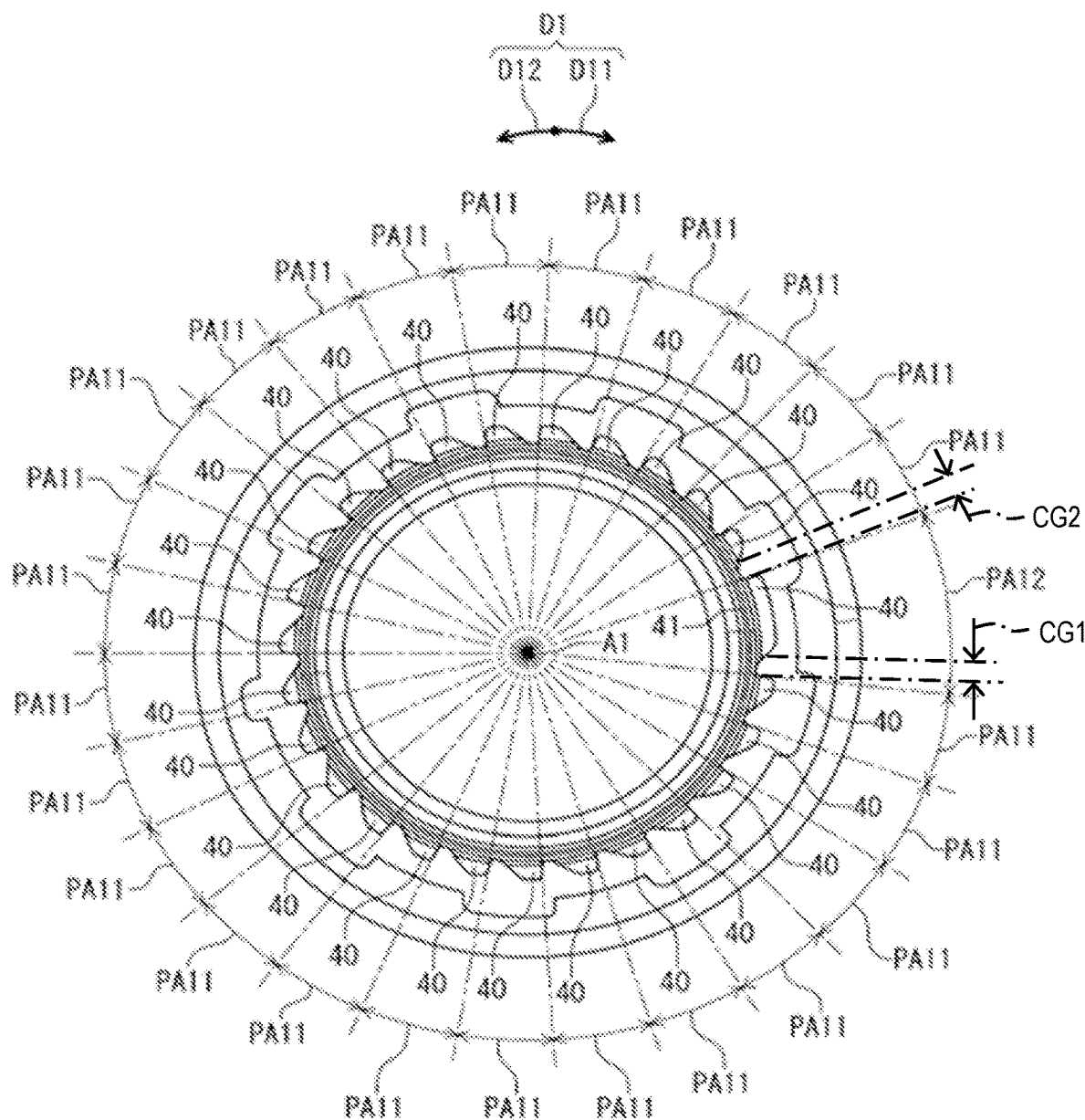
FIG. 10 is a side elevational view of a sprocket support body of the bicycle hub assembly in accordance with a modification.

The external spline teeth 40 have substantially the same shape as each other. The external spline teeth 40 have substantially the same spline size as each other. The external spline teeth 40 have substantially the same profile as each other when viewed along the rotational center axis A1. As seen in FIG. 10, however, at least one of the at least ten external spline teeth 40 can have a first spline shape different from a second spline shape of another of the at least ten external spline teeth 40. At least one of the at least ten external spline teeth 40 can have a first spline size different from a second spline size of another of the at least ten external spline teeth 40. At least one of the at least ten external spline teeth 40 can have a profile different from a profile of another of the at least ten external spline teeth 40 when viewed along the rotational center axis A1. In FIG. 10, one of the external spline teeth 40 has a spline shape different from a spline shape of the other teeth of the external spline teeth 40. One of the external spline teeth 40 has a spline size different from a spline size of the other teeth of the external spline teeth 40. One of the external spline teeth 40 has a profile different from a profile of the other teeth of the external spline teeth 40 when viewed along the rotational center axis A1.

Figure 11:
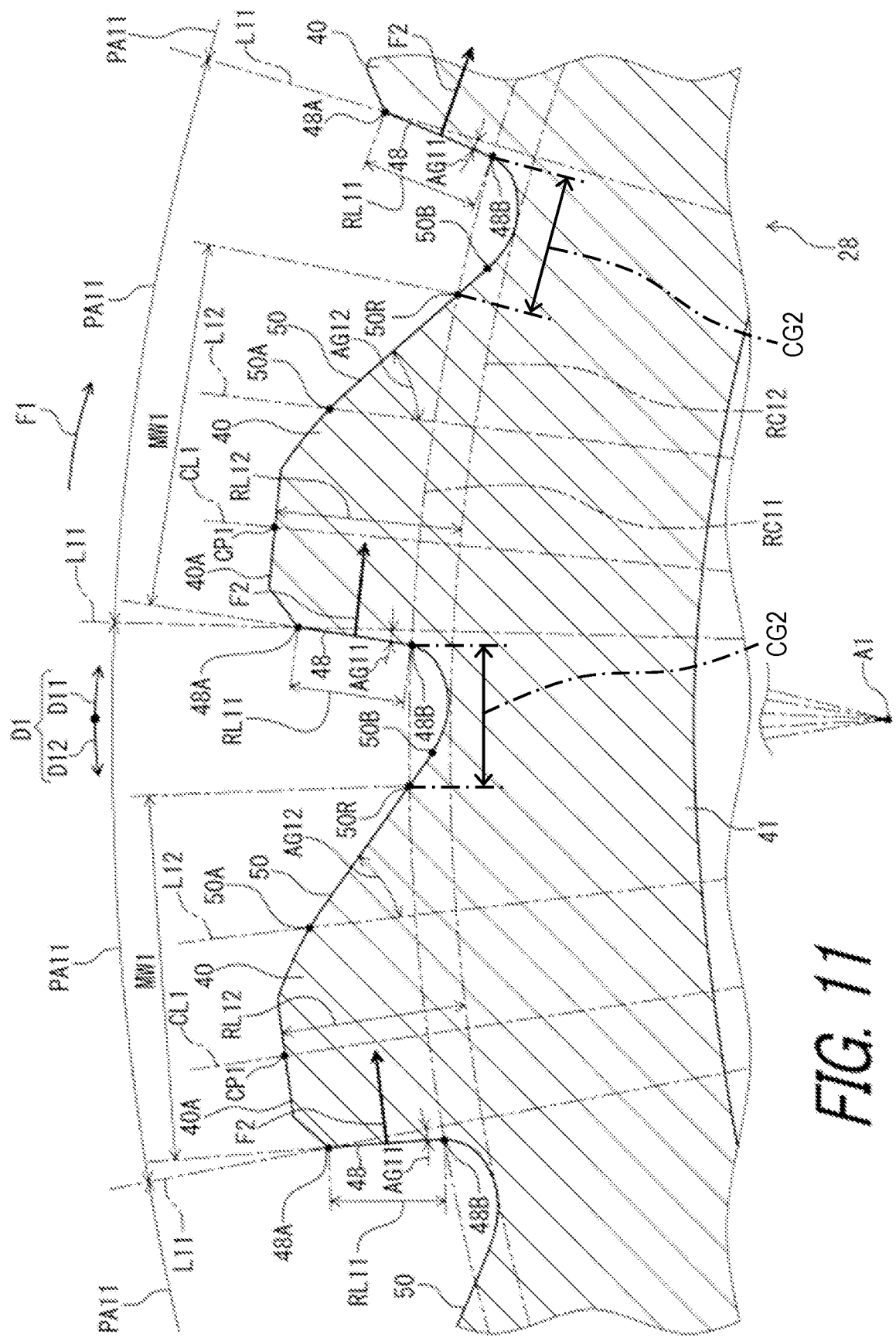
FIG. 11 is an enlarged cross-sectional view of the sprocket support body illustrated in FIG. 7.

As seen in FIG. 11, each of the at least ten external spline teeth 40 has an external-spline driving surface 48 and an external-spline non-driving surface 50. The plurality of external spline teeth 40 includes a plurality of external-spline driving surfaces 48 to receive the driving rotational force F1 from the bicycle rear sprocket assembly 14 (FIG. 6) during pedaling. The plurality of external spline teeth 40 includes a plurality of external-spline non-driving surfaces 50. The external-spline driving surface 48 is contactable with the bicycle rear sprocket assembly 14 to receive the driving rotational force F1 from the bicycle rear sprocket assembly 14 (FIG. 6) during pedaling. The external-spline driving surface 48 faces in the reverse rotational direction D12. The external-spline non-driving surface 50 is provided on a reverse side of the external-spline driving surface 48 in the circumferential direction D1. The external-spline non-driving surface 50 faces in the driving rotational direction D11 not to receive the driving rotational force F1 from the bicycle rear sprocket assembly 14 during pedaling.

The at least ten external spline teeth 40 respectively have circumferential maximum widths MW1 and circumferential gaps between the circumferential maximum widths of each of adjacent external spline teeth of the at least ten external spline teeth 40. The external spline teeth 40 respectively have circumferential maximum widths MW1. The circumferential maximum width MW1 is defined as a maximum width to receive a thrust force F2 applied to the external spline tooth 40. The circumferential maximum width MW1 is defined as a straight distance based on the external-spline driving surface 48. The at least ten external spline teeth 40 have a first circumferential gap CG1 corresponding to the two external spline teeth arranged at the second external pitch angle PA12, and second circumferential gaps CG2 corresponding to the remaining external spline teeth arranged at each of the first external pitch angles PA11. In FIG. 9, the first circumferential gap CG1 is larger than each of the plurality of second circumferential gaps CG2, and, in FIG. 10, the first circumferential gap CG1 is equal to each of the plurality of second circumferential gaps CG2.

The plurality of external-spline driving surfaces 48 each includes a radially outermost edge 48A and a radially innermost edge 48B. The external-spline driving surface 48 extends from the radially outermost edge 48A to the radially innermost edge 48B. A first reference circle RC11 is defined on the radially innermost edge 48B and is centered at the rotational center axis A1. The first reference circle RC11 intersects with the external-spline non-driving surface 50 at a reference point 50R. The circumferential maximum width MW1 extends straight from the radially innermost edge 48B to the reference point 50R in the circumferential direction D1.

The plurality of external-spline non-driving surfaces 50 each includes a radially outermost edge 50A and a radially innermost edge 50B. The external-spline non-driving surface 50 extends from the radially outermost edge 50A to the radially innermost edge 50B. The reference point 50R is provided between the radially outermost edge 50A and the radially innermost edge 50B. However, the reference point 50R can coincide with the radially innermost edge 50B.

A total of the circumferential maximum widths MW1 is equal to or larger than 55 mm. The total of the circumferential maximum widths MW1 is equal to or larger than 60 mm. The total of the circumferential maximum widths MW1 is equal to or larger than 65 mm. In this embodiment, the total of the circumferential maximum widths MW1 is 68 mm. However, the total of the circumferential maximum widths MW1 is not limited to this embodiment and the above ranges.

Figure 12:
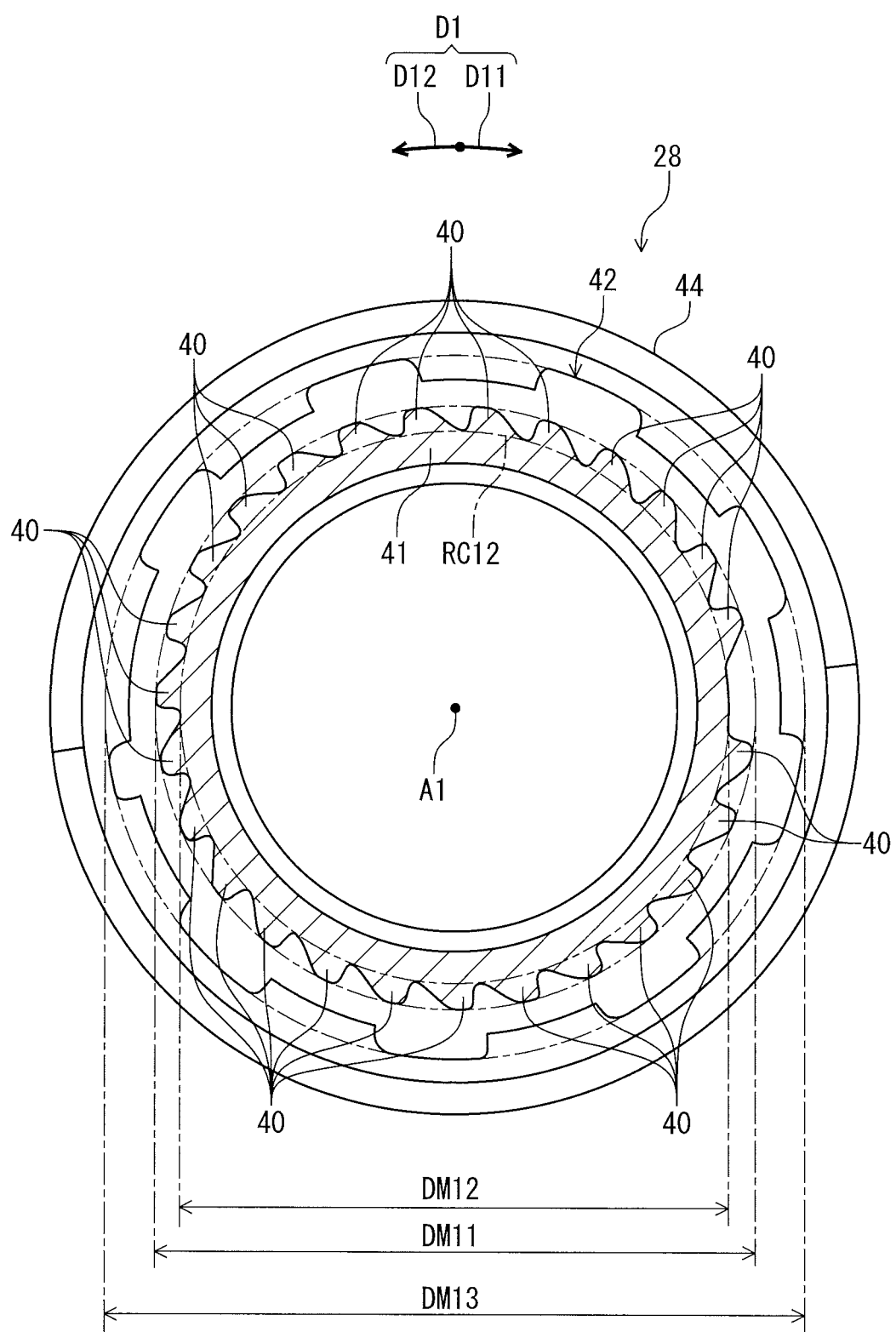
FIG. 12 is a cross-sectional view of the sprocket support body illustrated in FIG. 7.

As seen in FIG. 12, the at least one external spline tooth 40 has an external-spline major diameter DM11. The external-spline major diameter DM11 is equal to or larger than 25 mm. The external-spline major diameter DM11 is equal to or larger than 29 mm. The external-spline major diameter DM11 is equal to or smaller than 30 mm. In this embodiment, the external-spline major diameter DM11 is 29.6 mm. However, the external-spline major diameter DM11 is not limited to this embodiment and the above ranges.

The at least one external spline tooth 40 has an external-spline minor diameter DM12. The at least one external spline tooth 40 has an external-spline root circle RC12 having the external-spline minor diameter DM12. However, the external-spline root circle RC12 can have another diameter different from the external-spline minor diameter DM12. The external-spline minor diameter DM12 is equal to or smaller than 28 mm. The external-spline minor diameter DM12 is equal to or larger than 25 mm. The external-spline minor diameter DM12 is equal to or larger than 27 mm. In this embodiment, the external-spline minor diameter DM12 is 27.2 mm. However, the external-spline minor diameter DM12 is not limited to this embodiment and the above ranges.

The larger-diameter part 42 has an outer diameter DM13 larger than the external-spline major diameter DM11. The outer diameter DM13 ranges from 32 mm to 40 mm. In this embodiment, the outer diameter DM13 is 35 mm. However, the outer diameter DM13 is not limited to this embodiment.

As seen in FIG. 11, the plurality of external-spline driving surfaces 48 each includes a radial length RL11 defined from the radially outermost edge 48A to the radially innermost edge 48B. A total of the radial lengths RL11 of the plurality of external-spline driving surfaces 48 is equal to or larger than 7 mm. The total of the radial lengths RL11 is equal to or larger than 10 mm. The total of the radial lengths RL11 is equal to or larger than 15 mm. In this embodiment, the total of the radial lengths RL11 is 19.5 mm. However, the total of the radial lengths RL11 is not limited to this embodiment.

The plurality of external spline tooth 40 has an additional radial length RL12. The additional radial lengths RL12 are respectively defined from the external-spline root circle RC12 to radially outermost ends 40A of the plurality of external spline teeth 40. A total of the additional radial lengths RL12 is equal to or larger than 12 mm. In this embodiment, the total of the additional radial lengths RL12 is 31.85 mm. However, the total of the additional radial lengths RL12 is not limited to this embodiment.

At least one of the at least nine external spline teeth 40 has an asymmetric shape with respect to a circumferential tooth-tip center line CL1. The circumferential tooth-tip center line CL1 is a line connecting the rotational center axis A1 and a circumferential center point CP1 of the radially outermost end 40A of the external spline tooth 40. However, at least one of the external spline teeth 40 can have a symmetric shape with respect to the circumferential tooth-tip center line CL1. The at least one of the at least nine external spline teeth 40 comprises the external-spline driving surface 48 and the external-spline non-driving surface 50.

The external-spline driving surface 48 has a first external-spline-surface angle AG11. The first external-spline-surface angle AG11 is defined between the external-spline driving surface 48 and a first radial line L11. The first radial line L11 extends from the rotational center axis A1 of the bicycle hub assembly 12 to the radially outermost edge 48A of the external-spline driving surface 48. The first external pitch angle PA11 or the second external pitch angle PA12 is defined between the adjacent first radial lines L11 (see, e.g., FIG. 9).

The external-spline non-driving surface 50 has a second external-spline-surface angle AG12. The second external-spline-surface angle AG12 is defined between the external-spline non-driving surface 50 and a second radial line L12. The second radial line L12 extends from the rotational center axis A1 of the bicycle hub assembly 12 to the radially outermost edge 50A of the external-spline non-driving surface 50.

In this embodiment, the second external-spline-surface angle AG12 is different from the first external-spline-surface angle AG11. The first external-spline-surface angle AG11 is smaller than the second external-spline-surface angle AG12. However, the first external-spline-surface angle AG11 can be equal to or larger than the second external-spline-surface angle AG12.

The first external-spline-surface angle AG11 ranges from 0 degree to 10 degrees. The second external-spline-surface angle AG12 ranges from 0 degree to 60 degrees. In this embodiment, the first external-spline-surface angle AG11 is 5 degrees. The second external-spline-surface angle AG12 is 45 degrees. However, the first external-spline-surface angle AG11 and the second external-spline-surface angle AG12 are not limited to this embodiment and the above ranges.

Figure 13:
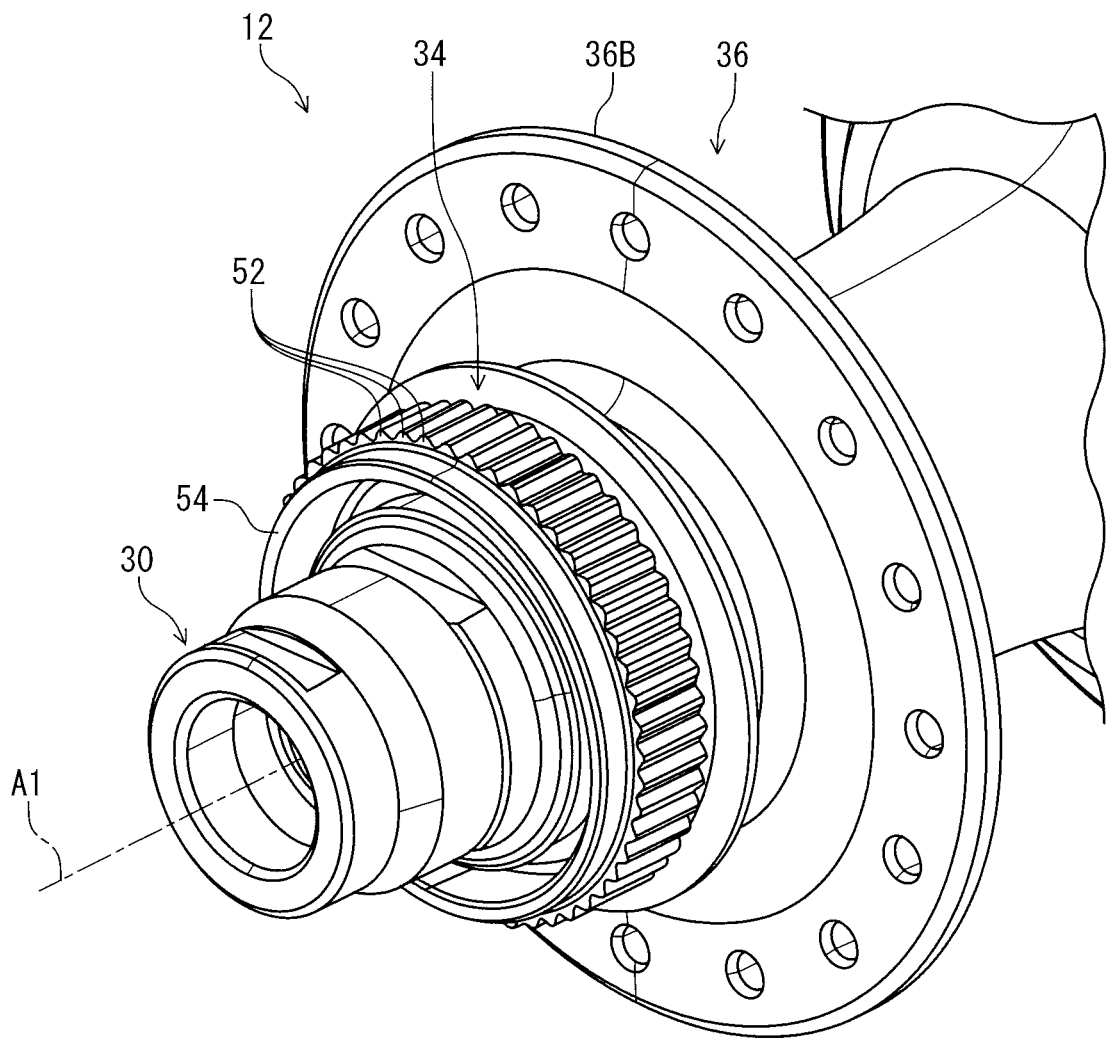
FIG. 13 is a perspective view of the bicycle hub assembly of the bicycle drive train illustrated in FIG. 2.
Figure 14:
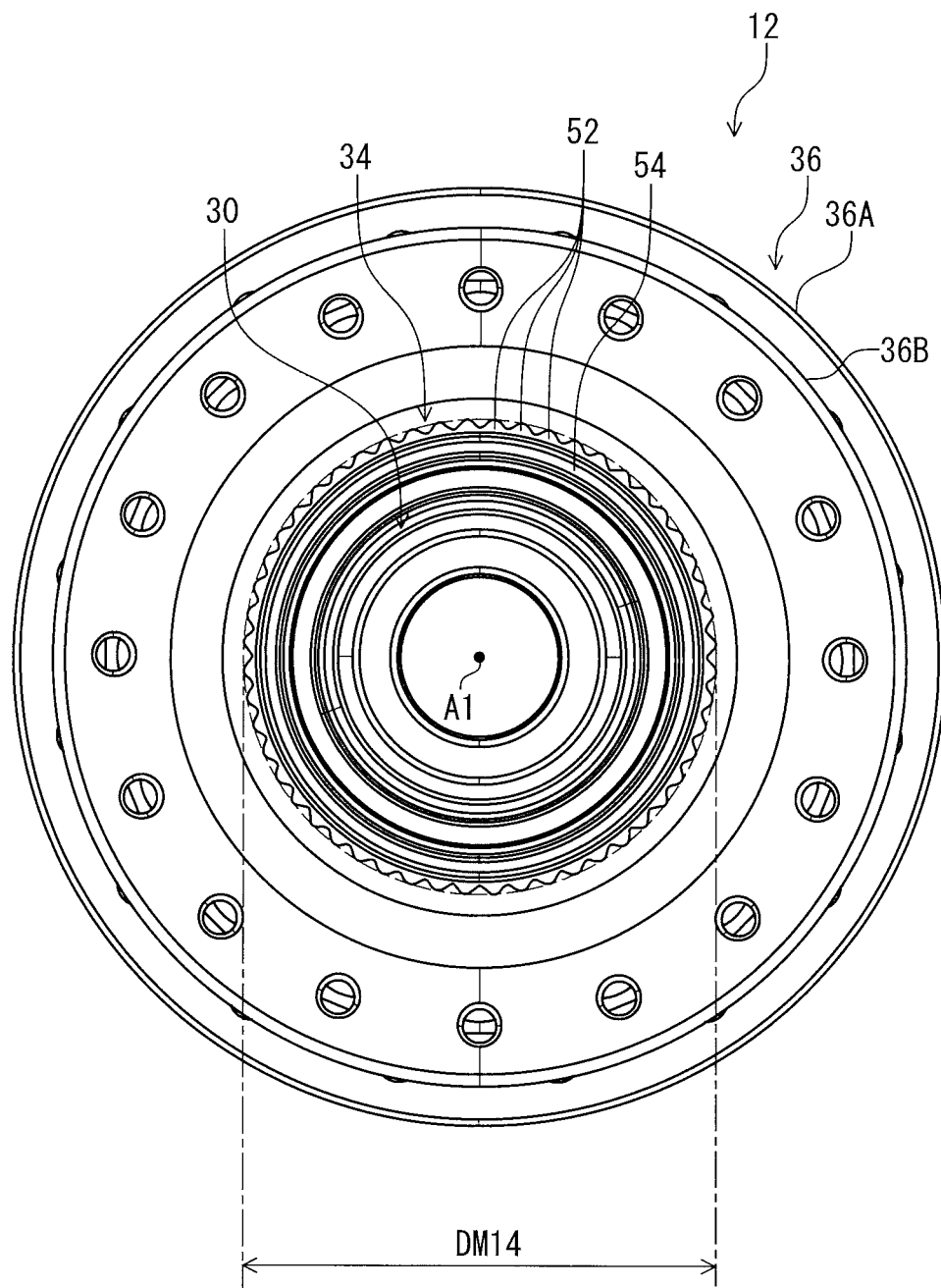
FIG. 14 is a side elevational view of the bicycle hub assembly of the bicycle drive train illustrated in FIG. 2.

As seen in FIGS. 13 and 14, the brake-rotor support body 34 includes at least one additional external spline tooth 52 configured to engage with the bicycle brake rotor 16 (FIG. 4). In this embodiment, the brake-rotor support body 34 includes an additional base support 54 and a plurality of additional external spline teeth 52. The additional base support 54 has a tubular shape and extends from the hub body 36 along the rotational center axis A1. The additional external spline tooth 52 extends radially outwardly from additional base support 54. A total number of the additional external spline teeth 52 is 52. However, the total number of the additional external spline teeth 52 is not limited to this embodiment.

Figure 15:
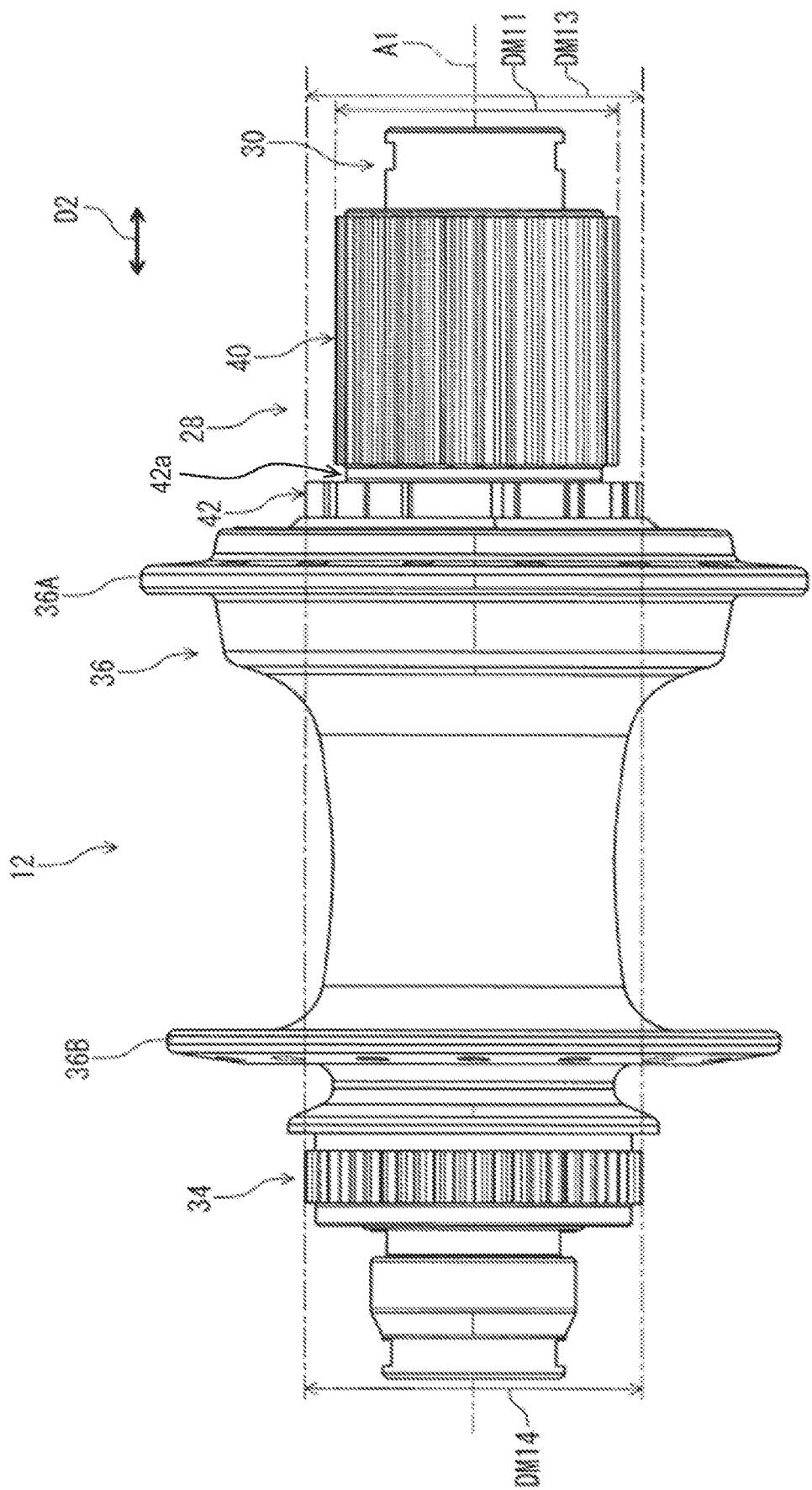
FIG. 15 is a rear view of the bicycle hub assembly of the bicycle drive train illustrated in FIG. 2.

As seen in FIG. 14, the at least one additional external spline tooth 52 has an additional external-spline major diameter DM14. As seen in FIG. 15, the additional external-spline major diameter DM14 is larger than the external-spline major diameter DM11. The additional external-spline major diameter DM14 is substantially equal to the outer diameter DM13 of the larger-diameter part 42. However, the additional external-spline major diameter DM14 can be equal to or smaller than the external-spline major diameter DM11. The additional external-spline major diameter DM14 can be different from the outer diameter DM13 of the larger-diameter part 42.

Figure 16:
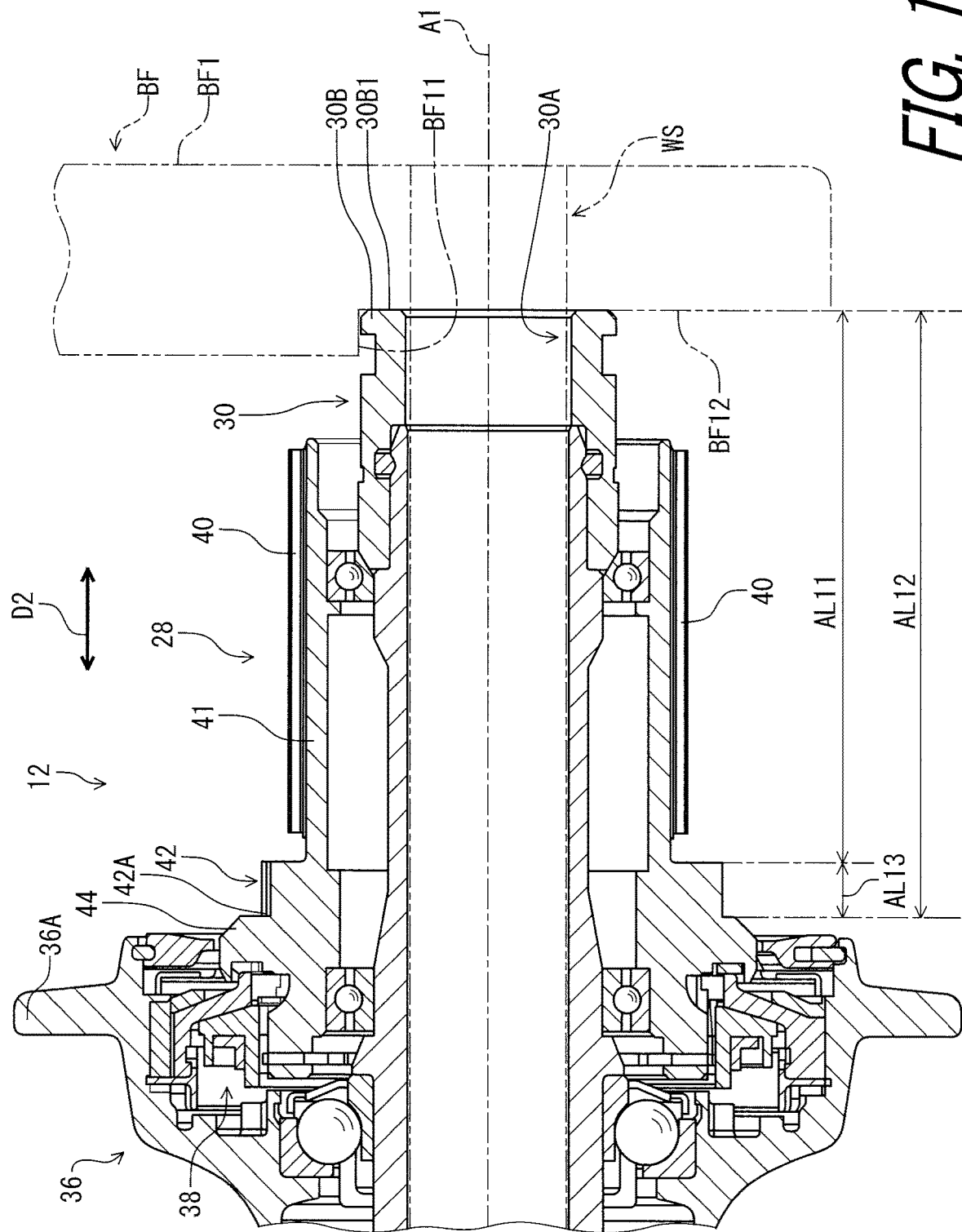
FIG. 16 is a cross-sectional view of the bicycle hub assembly taken along line XVI-XVI of FIG. 5.

As seen in FIG. 16, the hub axle 30 includes an axially contact surface 30B1 to contact the bicycle frame BF. In this embodiment, the axially contact surface 30B1 is contactable with the first frame BF1 of the bicycle frame BF. The first frame BF1 includes a frame contact surface BF12. The axially contact surface 30B1 is in contact with the frame contact surface BF12 in a state where the bicycle hub assembly 12 is secured to the bicycle frame BF with the wheel securing structure WS.

A first axial length AL11 is defined from the axially contact surface 30B1 to the larger-diameter part 42 in the axial direction D2 with respect to the rotational center axis A1. The first axial length AL11 ranges from 35 mm to 41 mm. The first axial length AL11 can be equal to or larger than 39 mm. The first axial length AL11 can also range from 35 mm to 37 mm. In this embodiment, the first axial length AL11 is 36.2 mm. However, the first axial length AL11 is not limited to this embodiment and the above ranges.

The larger-diameter part 42 has an axial end 42A which is the farthest from the axially contact surface 30B1 in the axial direction D2. A second axial length AL12 is defined from the axially contact surface 30B1 to the axial end 42A in the axial direction D2. The second axial length AL12 ranges from 38 mm to 47 mm. The second axial length AL12 can range from 44 mm to 45 mm. The second axial length AL12 can also range from 40 mm to 41 mm. In this embodiment, the second axial length AL12 is 40.75 mm. However, the second axial length AL12 is not limited to this embodiment and the above ranges.

An axial length AL13 of the larger-diameter part 42 ranges from 3 mm to 6 mm. In this embodiment, the axial length AL13 is 4.55 mm. However, the axial length AL13 is not limited to this embodiment and the above ranges.

Figure 17:
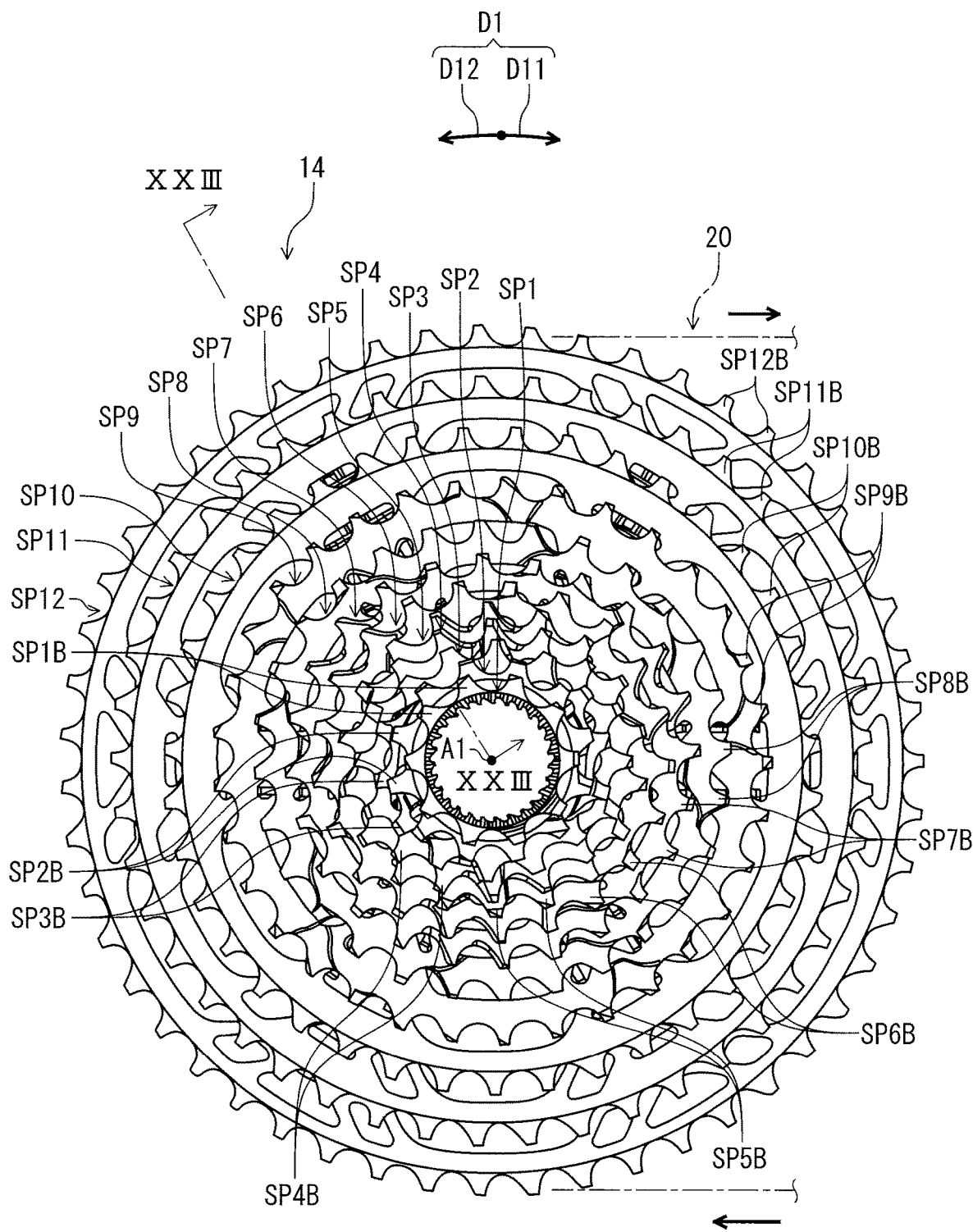
FIG. 17 is a side elevational view of the bicycle rear sprocket assembly of the bicycle drive train illustrated in FIG. 2.

As seen in FIG. 17, the bicycle rear sprocket assembly 14 comprises at least one sprocket. The at least one sprocket includes a smallest sprocket SP1 and a largest sprocket SP12. The smallest sprocket SP1 can also be referred to as a sprocket SP1. The largest sprocket SP12 can also be referred to as a sprocket SP12. In this embodiment, the at least one sprocket further includes sprockets SP2 to SP11. The sprocket SP1 corresponds to top gear. The sprocket SP12 corresponds to low gear. A total number of the sprockets of the bicycle rear sprocket assembly 14 is not limited to this embodiment.

The smallest sprocket SP1 includes at least one sprocket tooth SP1B. A total number of the at least one sprocket tooth SP1B of the smallest sprocket SP1 is equal to or smaller than 10. In this embodiment, the total number of the at least one sprocket tooth SP1B of the smallest sprocket SP1 is 10. However, the total number of the at least one sprocket tooth SP1B of the smallest sprocket SP1 is not limited to this embodiment and the above range.

The largest sprocket SP12 includes at least one sprocket tooth SP12B. A total number of the at least one sprocket tooth SP12B of the largest sprocket SP12 is equal to or larger than 46. The total number of the at least one sprocket tooth SP12B of the largest sprocket SP12 is equal to or larger than 50. In this embodiment, the total number of the at least one sprocket tooth SP12B of the largest sprocket SP12 is 51. However, the total number of the at least one sprocket tooth SP12B of the largest sprocket SP12 is not limited to this embodiment and the above ranges.

The sprocket SP2 includes at least one sprocket tooth SP2B. The sprocket SP3 includes at least one sprocket tooth SP3B. The sprocket SP4 includes at least one sprocket tooth SP4B. The sprocket SP5 includes at least one sprocket tooth SP5B. The sprocket SP6 includes at least one sprocket tooth SP6B. The sprocket SP7 includes at least one sprocket tooth SP7B. The sprocket SP8 includes at least one sprocket tooth SP8B. The sprocket SP9 includes at least one sprocket tooth SP9B. The sprocket SP10 includes at least one sprocket tooth SP10B. The sprocket SP11 includes at least one sprocket tooth SP11B.

A total number of the at least one sprocket tooth SP2B is 12. A total number of the at least one sprocket tooth SP3B is 14. A total number of the at least one sprocket tooth SP4B is 16. A total number of the at least one sprocket tooth SP5B is 18. A total number of the at least one sprocket tooth SP6B is 21. A total number of the at least one sprocket tooth SP7B is 24. A total number of the at least one sprocket tooth SP8B is 28. A total number of the at least one sprocket tooth SP9B is 33. A total number of the at least one sprocket tooth SP10B is 39. A total number of the at least one sprocket tooth SP11B is 45. The total number of the sprocket teeth of each of the sprockets SP2 to SP11 is not limited to this embodiment.

Figure 18:
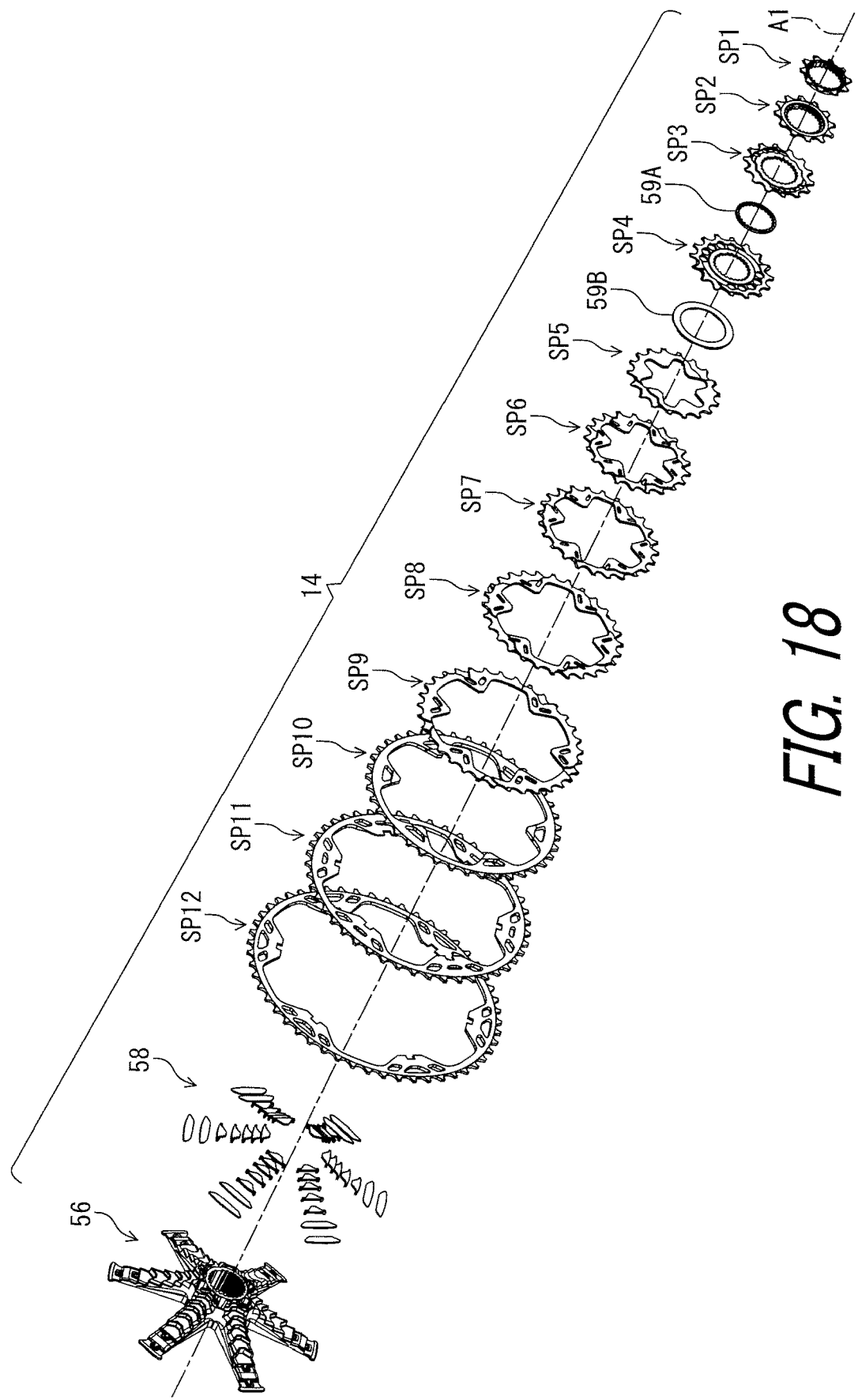
FIG. 18 is an exploded perspective view of the bicycle rear sprocket assembly illustrated in FIG. 17.

As seen in FIG. 18, the sprockets SP1 to SP12 are separate members from each other. However, at least one of the sprockets SP1 to SP12 can be at least partly provided integrally with another of the sprockets SP1 to SP12. The bicycle rear sprocket assembly 14 comprises a sprocket support 56, a plurality of spacers 58, a first ring 59A, and a second ring 59B. The sprockets SP1 to SP12 are attached to the sprocket support 56 in the illustrated embodiment.

Figure 19:
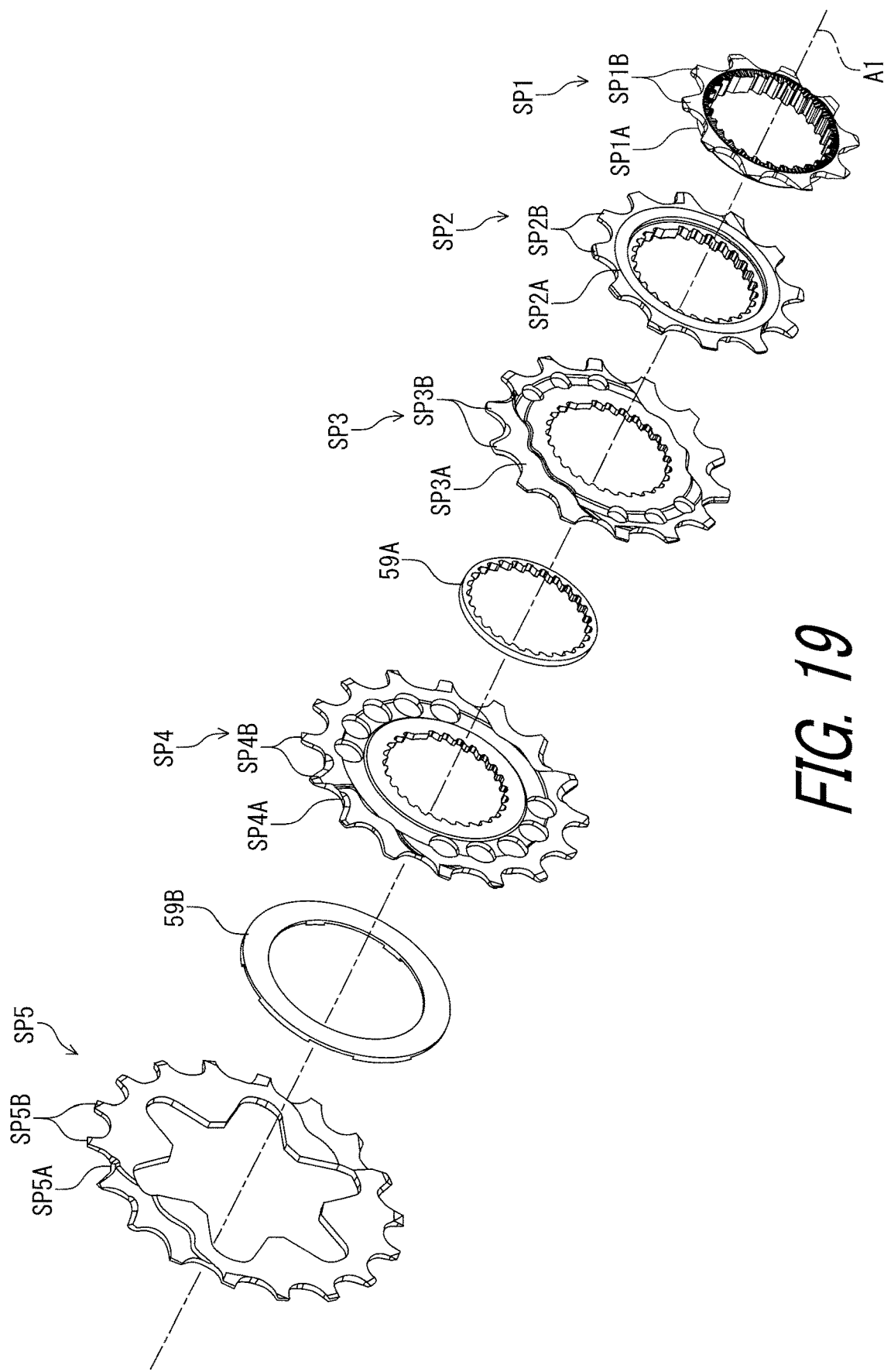
FIG. 19 is a partial exploded perspective view of the bicycle rear sprocket assembly illustrated in FIG. 17.

As seen in FIG. 19, the sprocket SP1 includes a sprocket body SP1A and the plurality of sprocket teeth SP1B. The plurality of sprocket teeth SP1B extends radially outwardly from the sprocket body SP1A. The sprocket SP2 includes a sprocket body SP2A and the plurality of sprocket teeth SP2B. The plurality of sprocket teeth SP2B extends radially outwardly from the sprocket body SP2A. The sprocket SP3 includes a sprocket body SP3A and the plurality of sprocket teeth SP3B. The plurality of sprocket teeth SP3B extends radially outwardly from the sprocket body SP3A. The sprocket SP4 includes a sprocket body SP4A and the plurality of sprocket teeth SP4B. The plurality of sprocket teeth SP4B extends radially outwardly from the sprocket body SP4A. The sprocket SP5 includes a sprocket body SP5A and the plurality of sprocket teeth SP5B. The plurality of sprocket teeth SP5B extends radially outwardly from the sprocket body SP5A. The first ring 59A is provided between the sprockets SP3 and SP4. The second ring 59B is provided between the sprockets SP4 and SP5.

Figure 20:
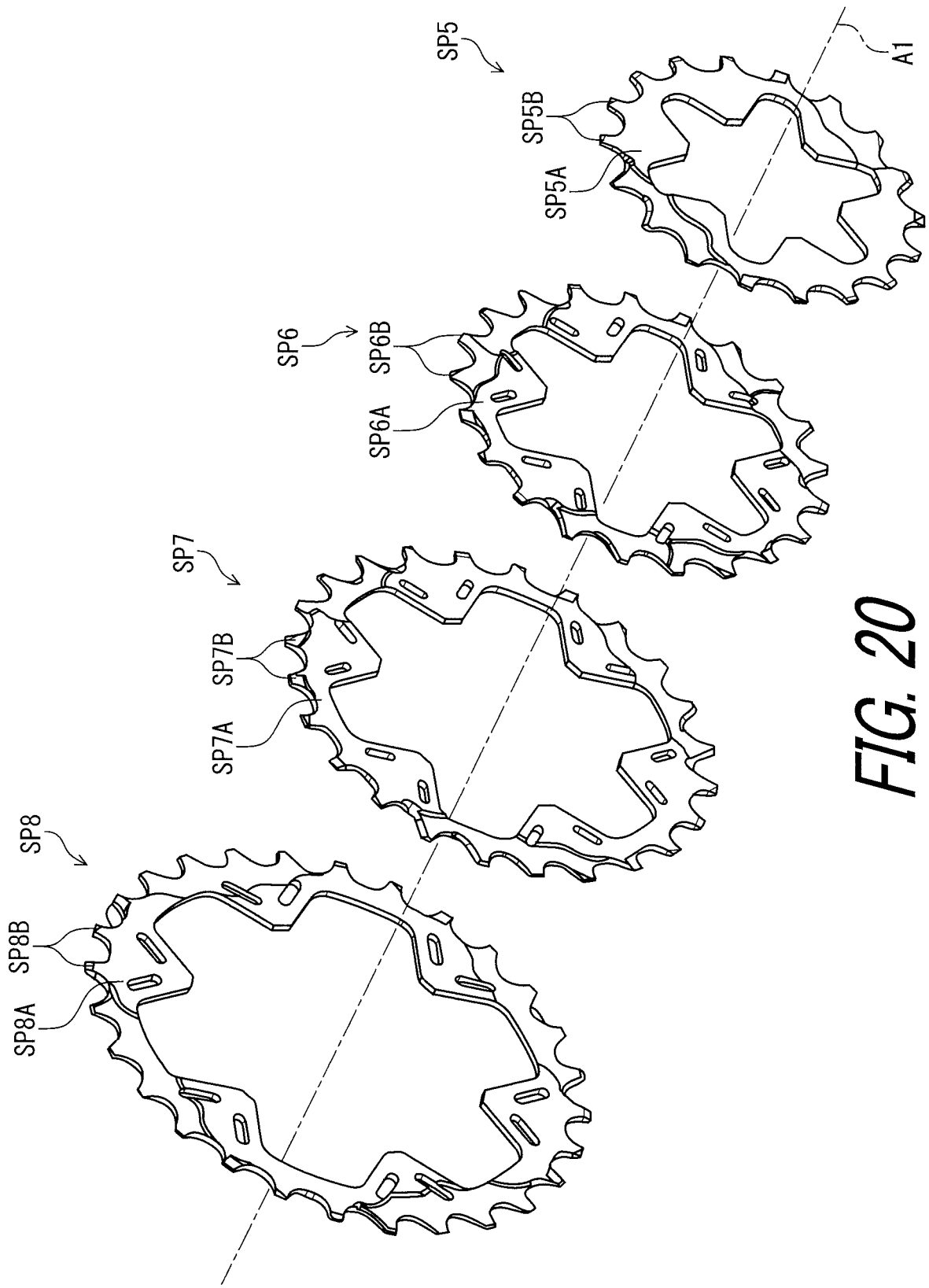
FIG. 20 is another partial exploded perspective view of the bicycle rear sprocket assembly illustrated in FIG. 17.

As seen in FIG. 20, the sprocket SP6 includes a sprocket body SP6A and the plurality of sprocket teeth SP6B. The plurality of sprocket teeth SP6B extends radially outwardly from the sprocket body SP6A. The sprocket SP7 includes a sprocket body SP7A and the plurality of sprocket teeth SP7B. The plurality of sprocket teeth SP7B extends radially outwardly from the sprocket body SP7A. The sprocket SP8 includes a sprocket body SP8A and the plurality of sprocket teeth SP8B. The plurality of sprocket teeth SP8B extends radially outwardly from the sprocket body SP8A.

Figure 21:
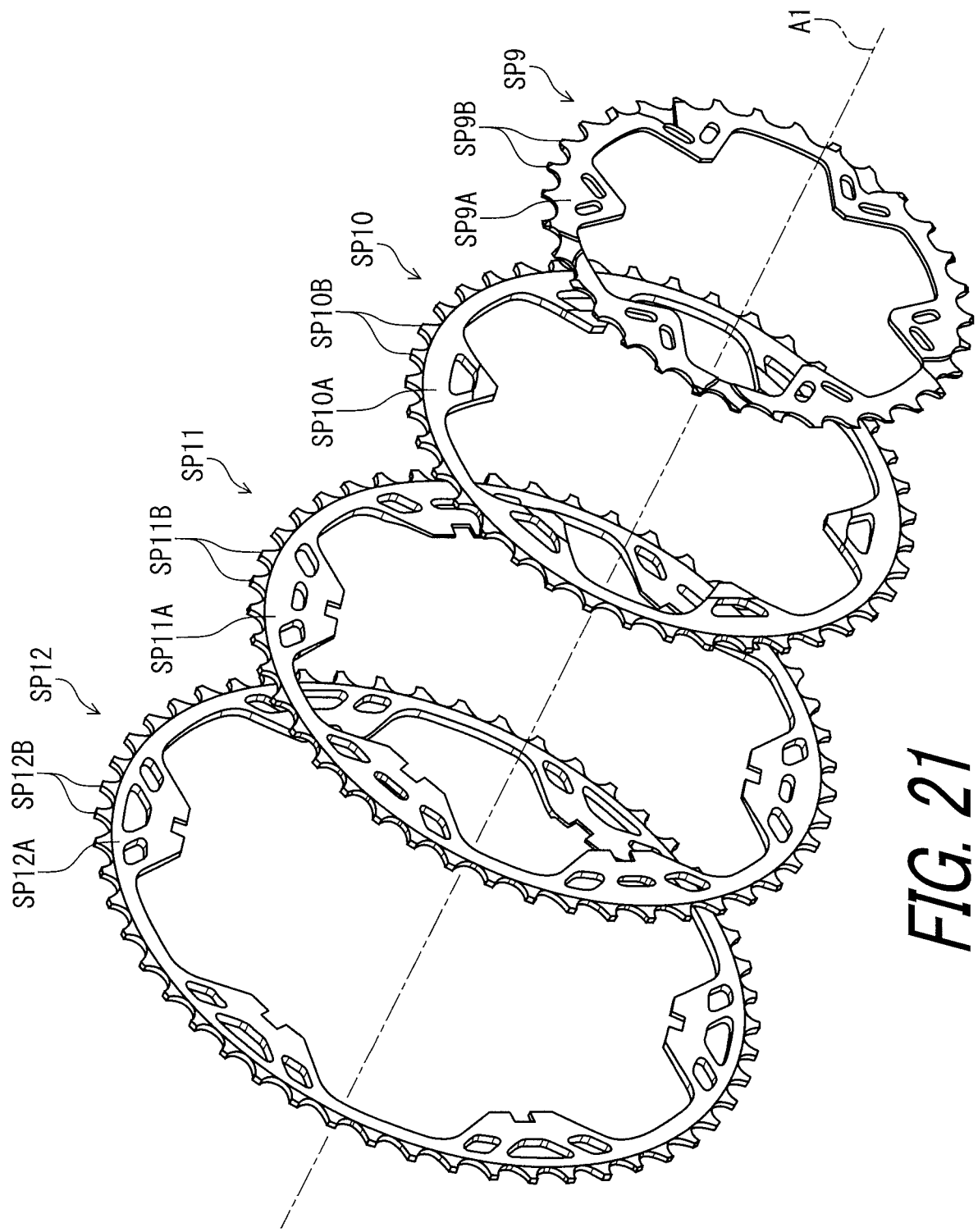
FIG. 21 is another partial exploded perspective view of the bicycle rear sprocket assembly illustrated in FIG. 17.

As seen in FIG. 21, the sprocket SP9 includes a sprocket body SP9A and the plurality of sprocket teeth SP9B. The plurality of sprocket teeth SP9B extends radially outwardly from the sprocket body SP9A. The sprocket SP10 includes a sprocket body SP10A and the plurality of sprocket teeth SP10B. The plurality of sprocket teeth SP10B extends radially outwardly from the sprocket body SP10A. The sprocket SP11 includes a sprocket body SP11A and the plurality of sprocket teeth SP11B. The plurality of sprocket teeth SP11B extends radially outwardly from the sprocket body SP11A. The sprocket SP12 includes a sprocket body SP12A and the plurality of sprocket teeth SP12B. The plurality of sprocket teeth SP12B extends radially outwardly from the sprocket body SP12A.

Figure 22:
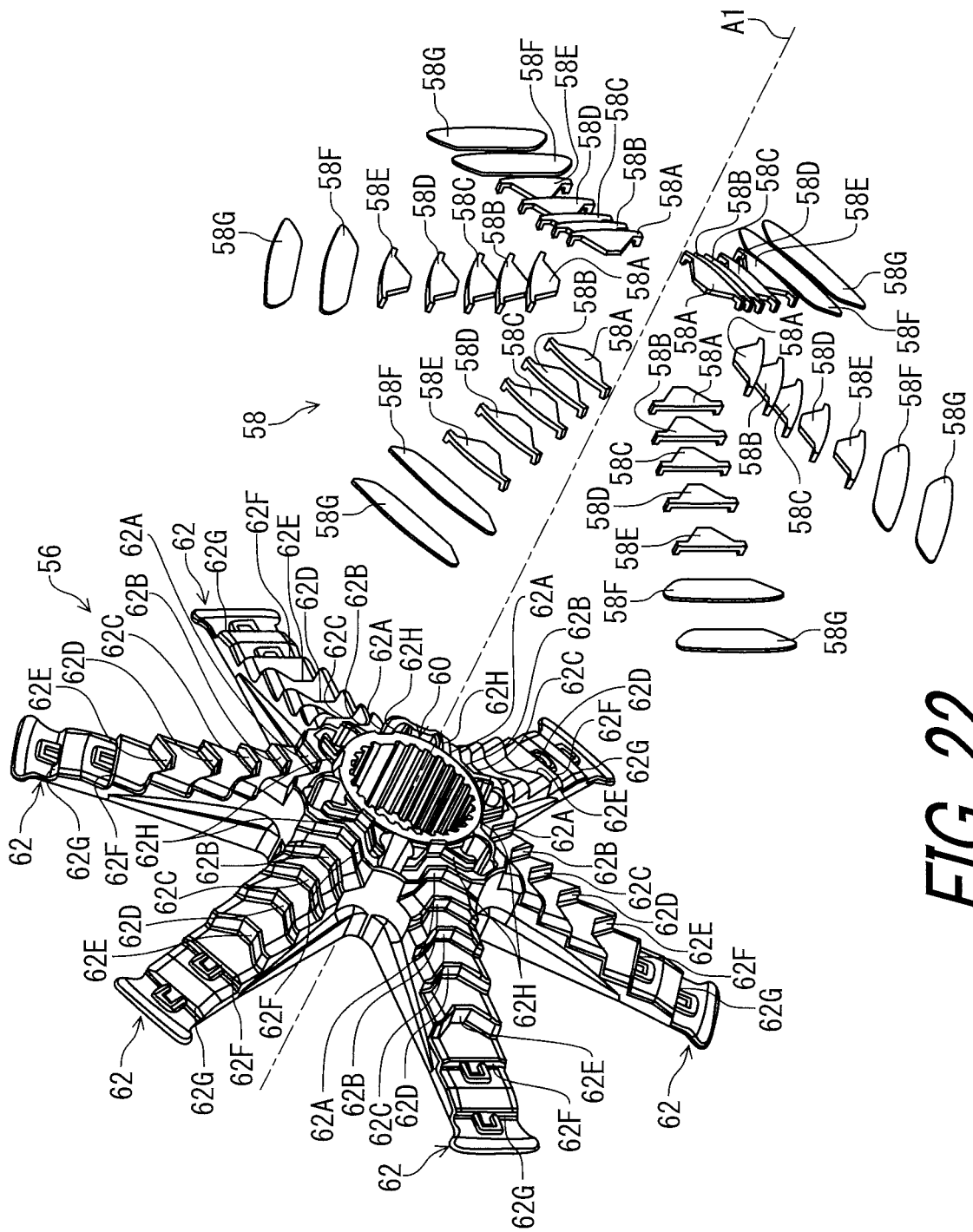
FIG. 22 is another partial exploded perspective view of the bicycle rear sprocket assembly illustrated in FIG. 17.

As seen in FIG. 22, the sprocket support 56 includes a hub engagement part 60 and a plurality of support arms 62. The plurality of support arms 62 extends radially outwardly from the hub engagement part 60. The support arm 62 includes first to eighth attachment parts 62A to 62H. The plurality of spacers 58 includes a plurality of first spacers 58A, a plurality of second spacers 58B, a plurality of third spacers 58C, a plurality of fourth spacers 58D, a plurality of fifth spacers 58E, a plurality of sixth spacers 58F, and a plurality of seventh spacers 58G.

Figure 23:
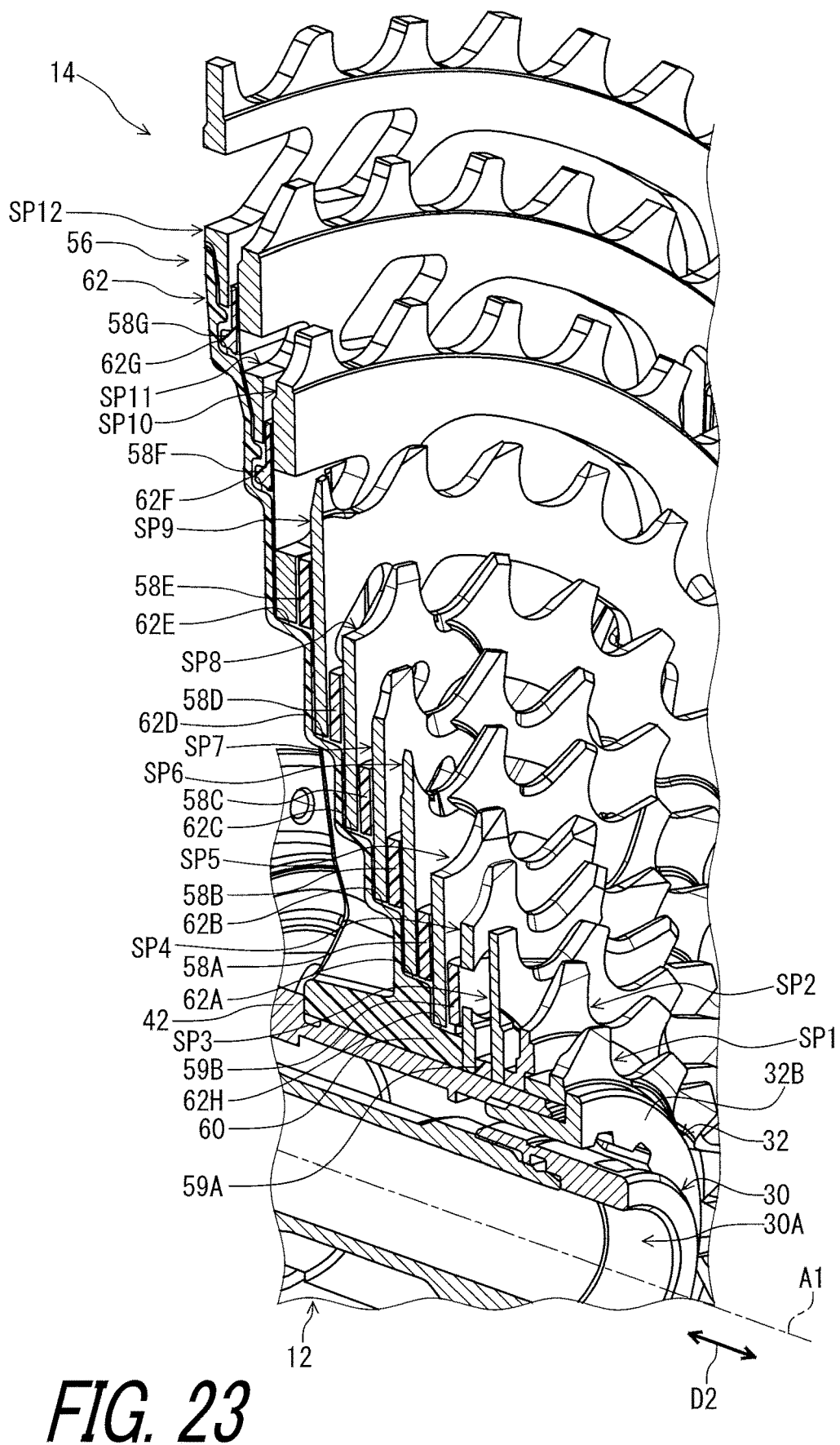
FIG. 23 is a perspective cross-sectional view of the bicycle rear sprocket assembly taken along line XXIII-XXIII of FIG. 17.

As seen in FIG. 23, the first spacers 58A are provided between the sprockets SP5 and SP6. The second spacers 58B are provided between the sprockets SP6 and SP7. The third spacers 58C are provided between the sprockets SP7 and SP8. The fourth spacers 58D are provided between the sprockets SP8 and SP9. The fifth spacers 58E are provided between the sprockets SP9 and SP10. The sixth spacers 58F are provided between the sprockets SP10 and SP11. The seventh spacers 58G are provided between the sprockets SP11 and SP12.

The sprocket SP6 and the first spacer 58A are attached to the first attachment part 62A with a bonding structure such as an adhesive agent. The sprocket SP7 and the second spacer 58B are attached to the second attachment part 62B with a bonding structure such as an adhesive agent. The sprocket SP8 and the third spacer 58C are attached to the third attachment part 62C with a bonding structure such as an adhesive agent. The sprocket SP9 and the fourth spacer 58D are attached to the fourth attachment part 62D with a bonding structure such as an adhesive agent. The sprocket SP10 and the fifth spacer 58E are attached to the fifth attachment part 62E with a bonding structure such as an adhesive agent. The sprocket SP11 and the sixth spacer 58F are attached to the sixth attachment part 62F with a bonding structure such as an adhesive agent. The sprocket SP12 and the seventh spacer 58G are attached to the seventh attachment part 62G with a bonding structure such as an adhesive agent. The sprocket SP5 and the second ring 59B are attached to the eighth attachment part 62H with a bonding structure such as an adhesive agent. The hub engagement part 60, the sprockets SP1 to SP4, the first ring 59A, and the second ring 59B are held between the larger-diameter part 42 and the lock flange 32B of the lock ring 32 in the axial direction D2.

In this embodiment, each of the sprockets SP1 to SP12 is made of a metallic material such as aluminum, iron, or titanium. Each of the sprocket support 56, the first to seventh spacers 58A and to 58G, the first ring 59A, and the second ring 59B is made of a non-metallic material such as a resin material. However, at least one of the sprockets SP1 to SP12 can be at least partly made of a non-metallic material. At least one of the sprocket support 56, the first to seventh spacers 58A and to 58G, the first ring 59A, and the second ring 59B can be at least partly made of a metallic material such as aluminum, iron, or titanium.

Figure 24:
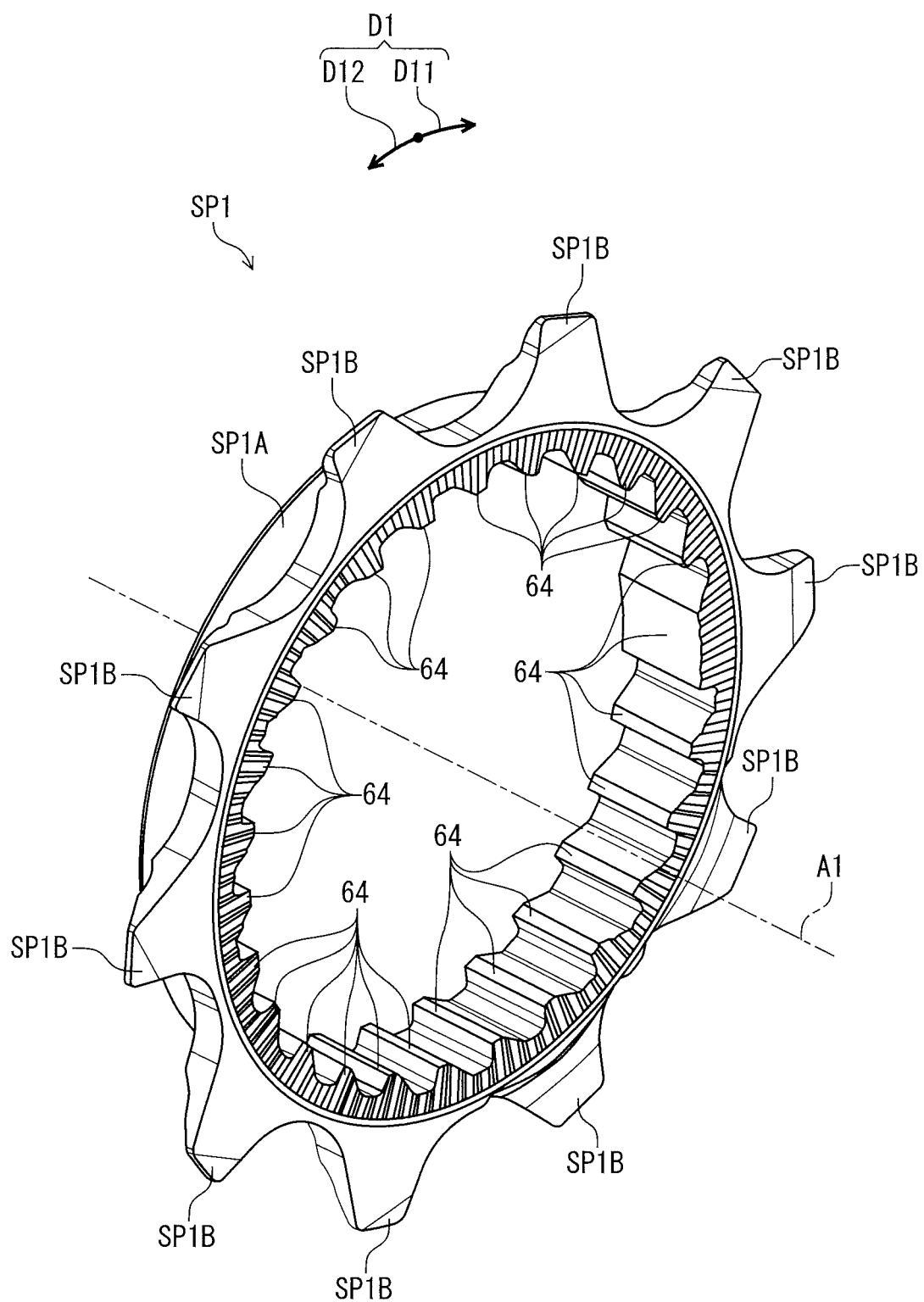
FIG. 24 is a perspective view of a smallest sprocket of the bicycle rear sprocket assembly illustrated in FIG. 17.
Figure 25:
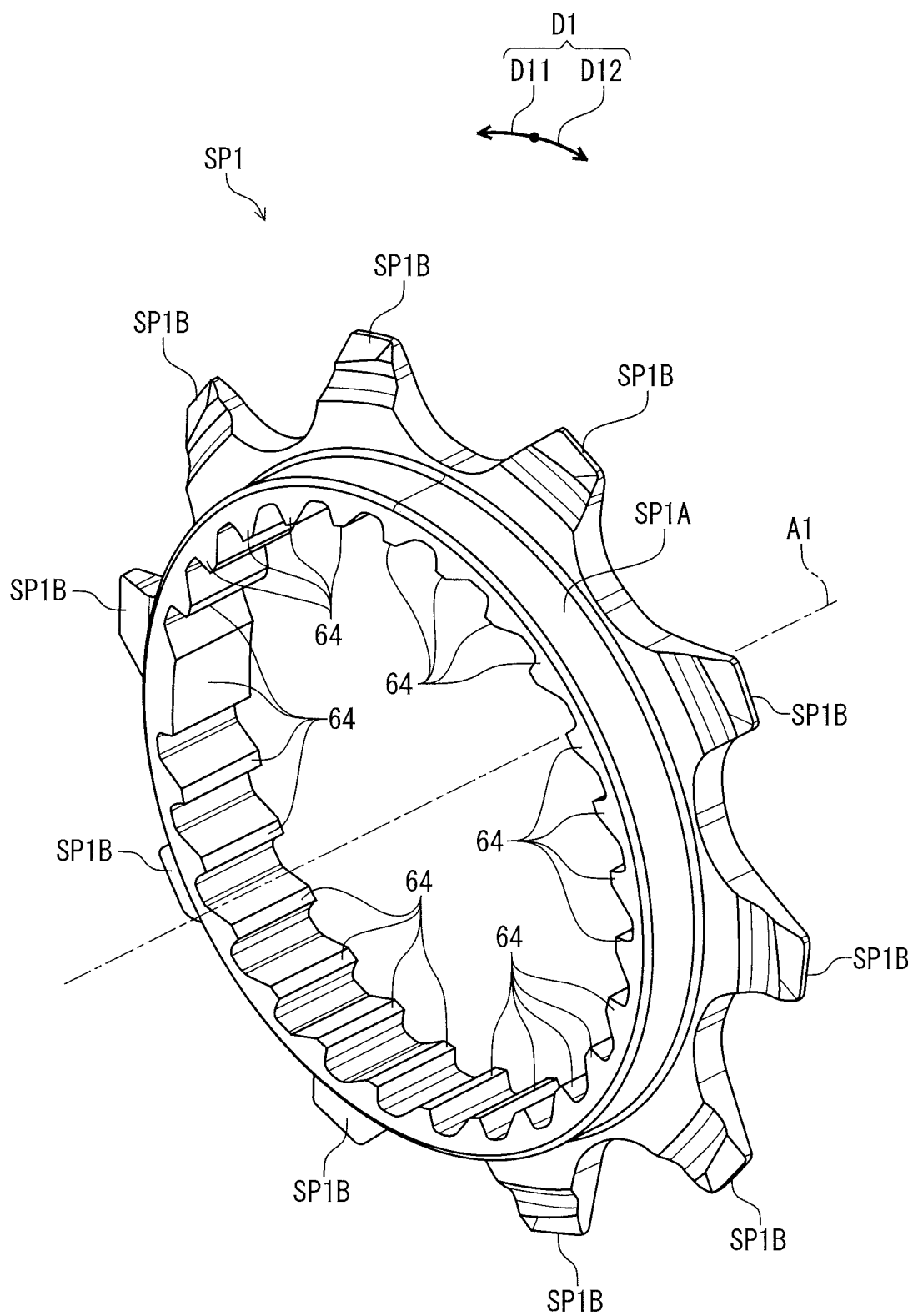
FIG. 25 is another perspective view of the smallest sprocket of the bicycle rear sprocket assembly illustrated in FIG. 17.

The at least one sprocket includes at least one internal spline tooth configured to engage with the bicycle hub assembly 12. As seen in FIGS. 24 and 25, the at least one sprocket includes at least ten internal spline teeth configured to engage with the bicycle hub assembly 12. The at least one internal spline tooth includes a plurality of internal spline teeth. Thus, the at least one sprocket includes a plurality of internal spline teeth configured to engage with the bicycle hub assembly 12. In this embodiment, the sprocket SP1 includes at least ten internal spline teeth 64 configured to engage with the bicycle hub assembly 12. In this embodiment, the sprocket SP1 includes the internal spline teeth 64 configured to mesh with the external spline teeth 40 of the sprocket support body 28 of the bicycle hub assembly 12. The sprocket body SP1A has an annular shape. The internal spline teeth 64 extend radially inwardly from the sprocket body SP1A.

Figure 26:
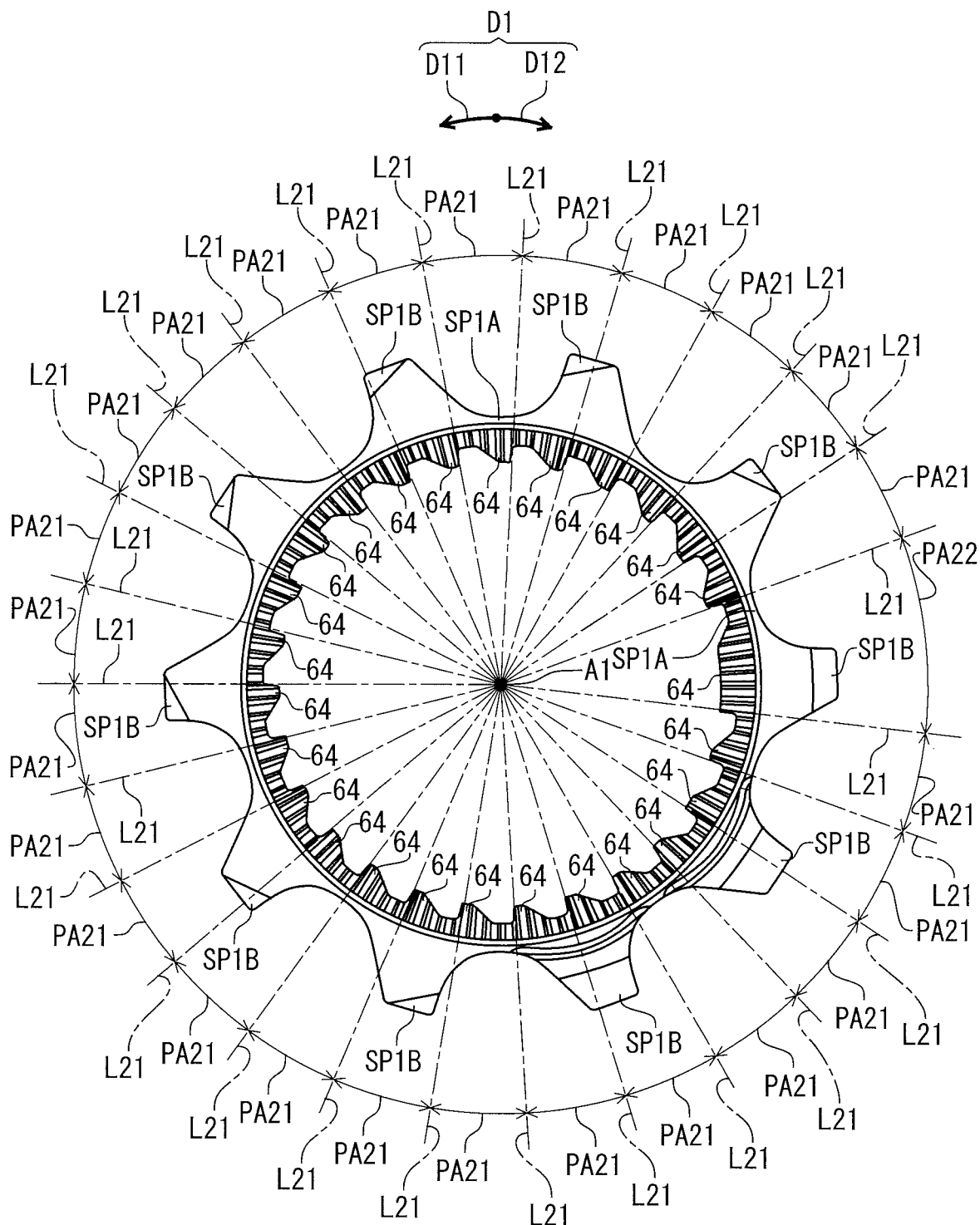
FIG. 26 is a side elevational view of the smallest sprocket of the bicycle rear sprocket assembly illustrated in FIG. 17.

As seen in FIG. 26, a total number of the at least ten internal spline teeth 64 is equal to or larger than 20. The total number of the at least ten internal spline teeth 64 is equal to or larger than 25. In this embodiment, the total number of the internal spline teeth 64 is 26. However, the total number of the internal spline teeth 64 is not limited to this embodiment and the above ranges.

The at least ten internal spline teeth 64 have a first internal pitch angle PA21 and a second internal pitch angle PA22. At least two internal spline teeth of the plurality of internal spline teeth 64 is circumferentially arranged at a first internal pitch angle PA21 with respect to the rotational center axis A1 of the bicycle rear sprocket assembly 14. At least two internal spline teeth of the plurality of internal spline teeth 64 is circumferentially arranged at a second internal pitch angle PA22 with respect to the rotational center axis A1. In this embodiment, the second internal pitch angle PA22 is different from the first internal pitch angle PA21. However, the second internal pitch angle PA22 can be substantially equal to the first internal pitch angle PA21.

In this embodiment, the internal spline teeth 64 are circumferentially arranged at the first internal pitch angle PA21 in the circumferential direction D1. Two internal spline teeth of the internal spline teeth 64 is arranged at the second internal pitch angle PA22 in the circumferential direction D1. However, at least two internal spline teeth of the internal spline teeth 64 can be arranged at another internal pitch angle in the circumferential direction D1.

The first internal pitch angle PA21 ranges from 10 degrees to 20 degrees. The first internal pitch angle PA21 ranges from 12 degrees to 15 degrees. The first internal pitch angle PA21 ranges from 13 degrees to 14 degrees. In this embodiment, the first internal pitch angle PA21 is 13.3 degrees. However, the first internal pitch angle PA21 is not limited to this embodiment and the above ranges.

The second internal pitch angle PA22 ranges from 5 degrees to 30 degrees. In this embodiment, the second internal pitch angle PA22 is 26 degrees. However, the second internal pitch angle PA22 is not limited to this embodiment and the above range.

Figure 27:
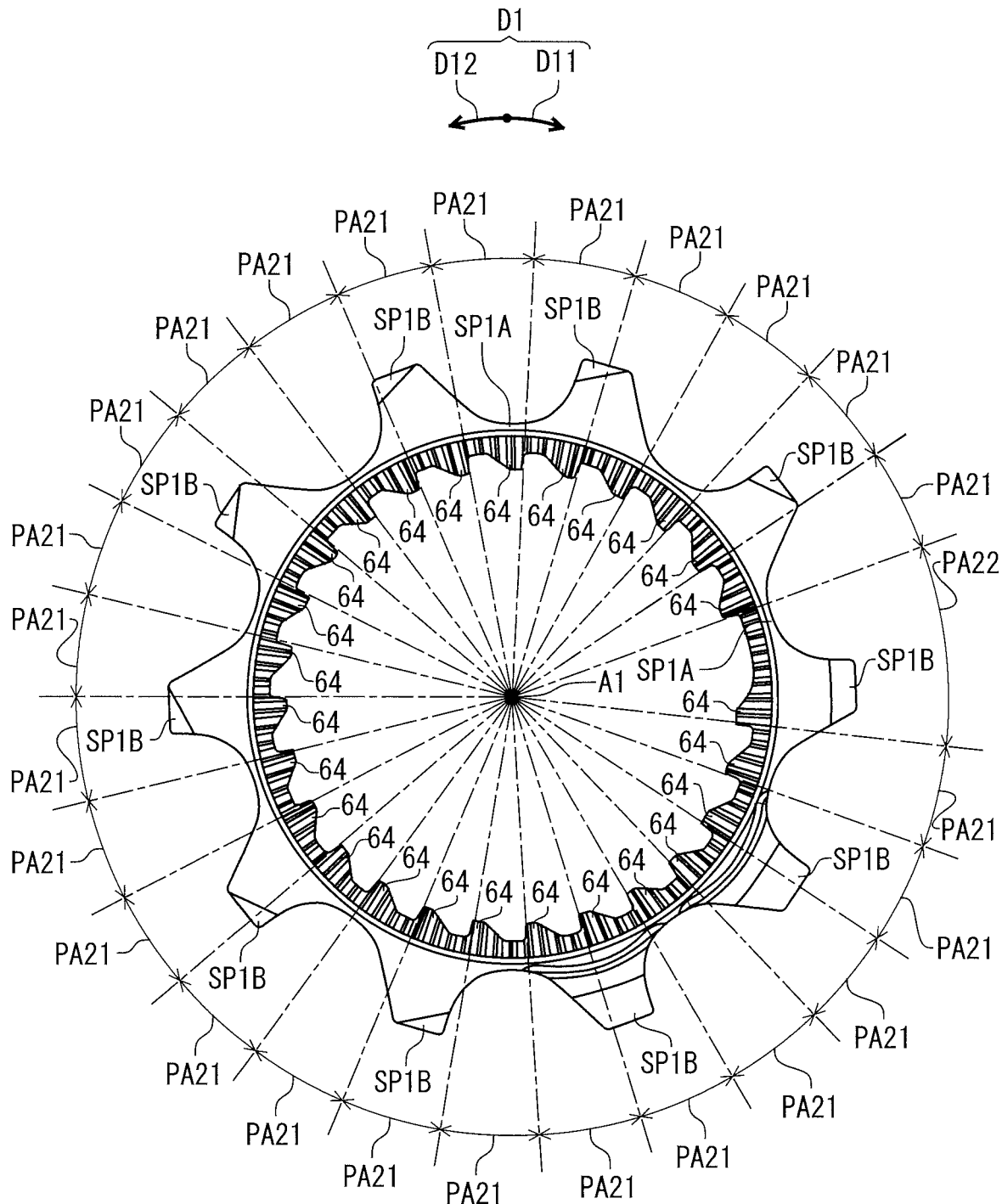
FIG. 27 is a side elevational view of a smallest sprocket in accordance with a modification.

At least one of the at least ten internal spline teeth 64 has a first spline shape different from a second spline shape of another of the at least ten internal spline teeth 64. At least one of the at least ten internal spline teeth 64 has a first spline size different from a second spline size of another of the at least ten internal spline teeth 64. At least one of the at least ten internal spline teeth 64 has a cross-sectional shape different from a cross-sectional shape of another of the at least ten internal spline teeth 64. As seen in FIG. 27, however, the internal spline teeth 64 can have the same shape as each other. The internal spline teeth 64 can have the same size as each other. The internal spline teeth 64 can have the same cross-sectional shape as each other.

Figure 28:
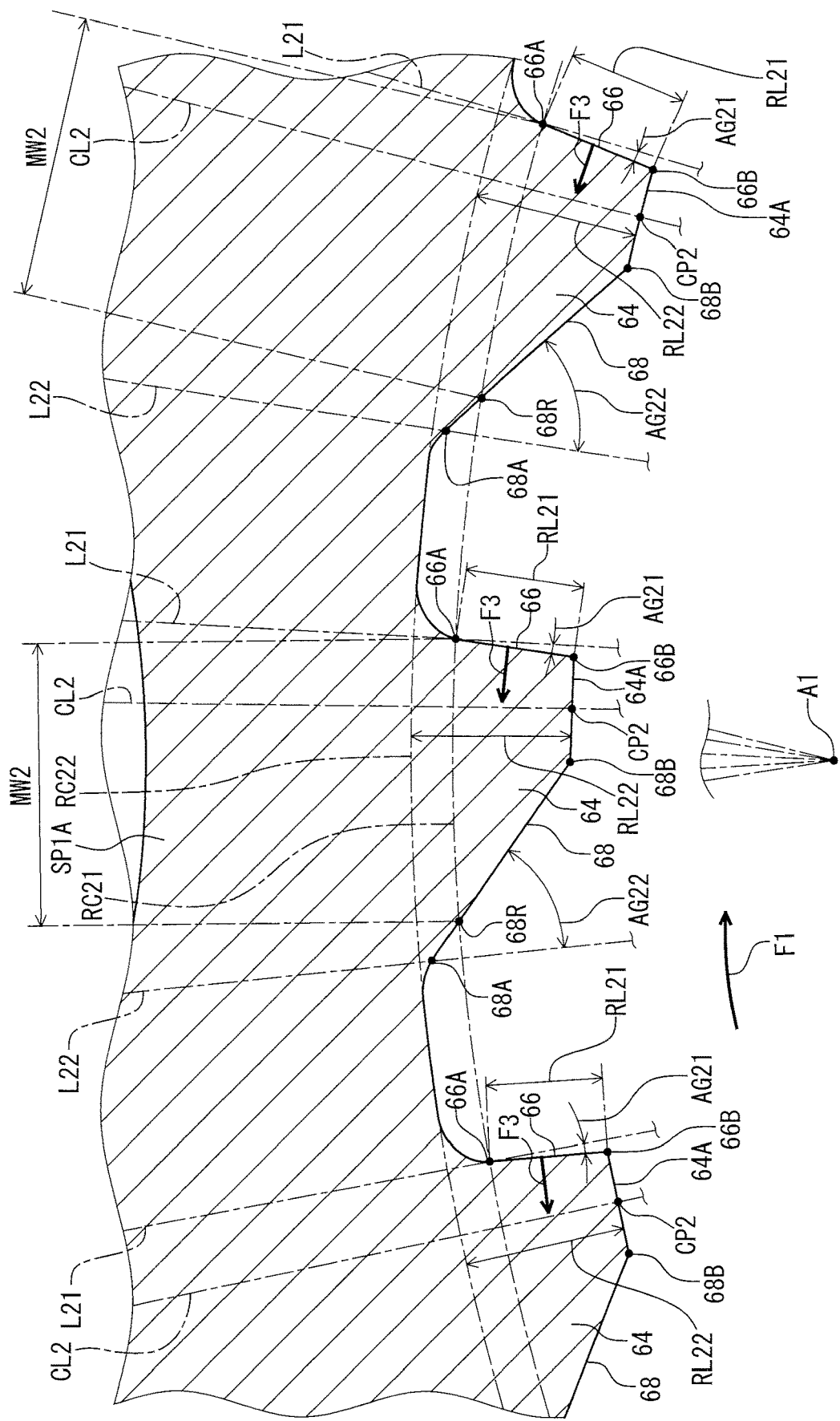
FIG. 28 is an enlarged cross-sectional view of the smallest sprocket illustrated in FIG. 24.

As seen in FIG. 28, the at least one internal spline tooth 64 comprises an internal-spline driving surface 66 and an internal-spline non-driving surface 68. The at least one internal spline tooth 64 includes a plurality of internal spline teeth 64. The plurality of internal spline teeth 64 includes a plurality of internal-spline driving surfaces 66 to receive the driving rotational force F1 from the bicycle hub assembly 12 (FIG. 6) during pedaling. The plurality of internal spline teeth 64 includes a plurality of internal-spline non-driving surfaces 68. The internal-spline driving surface 66 is contactable with the sprocket support body 28 to transmit the driving rotational force F1 from the sprocket SP1 to the sprocket support body 28 during pedaling. The internal-spline driving surface 66 faces in the driving rotational direction D11. The internal-spline non-driving surface 68 is provided on a reverse side of the internal-spline driving surface 66 in the circumferential direction D1. The internal-spline non-driving surface 68 faces in the reverse rotational direction D12 not to transmit the driving rotational force F1 from the sprocket SP1 to the sprocket support body 28 during pedaling.

The at least ten internal spline teeth 64 respectively have circumferential maximum widths MW2. The internal spline teeth 64 respectively have circumferential maximum widths MW2. The circumferential maximum width MW2 is defined as a maximum width to receive a thrust force F3 applied to the internal spline tooth 64. The circumferential maximum width MW2 is defined as a straight distance based on the internal-spline driving surface 66.

The internal-spline driving surface 66 includes a radially outermost edge 66A and a radially innermost edge 66B. The internal-spline driving surface 66 extends from the radially outermost edge 66A to the radially innermost edge 66B. A second reference circle RC21 is defined on the radially outermost edge 66A and is centered at the rotational center axis A1. The second reference circle RC21 intersects with the internal-spline non-driving surface 68 at a reference point 68R. The circumferential maximum width MW2 extends straight from the radially innermost edge 66B to the reference point 68R in the circumferential direction D1.

The internal-spline non-driving surface 68 includes a radially outermost edge 68A and a radially innermost edge 68B. The internal-spline non-driving surface 68 extends from the radially outermost edge 68A to the radially innermost edge 68B. The reference point 68R is provided between the radially outermost edge 68A and the radially innermost edge 68B.

A total of the circumferential maximum widths MW2 is equal to or larger than 40 mm. The total of the circumferential maximum widths MW2 is equal to or larger than 45 mm. The total of the circumferential maximum widths MW2 is equal to or larger than 50 mm. In this embodiment, the total of the circumferential maximum widths MW2 is 50.8 mm. However, the total of the circumferential maximum widths MW2 is not limited to this embodiment.

Figure 29:
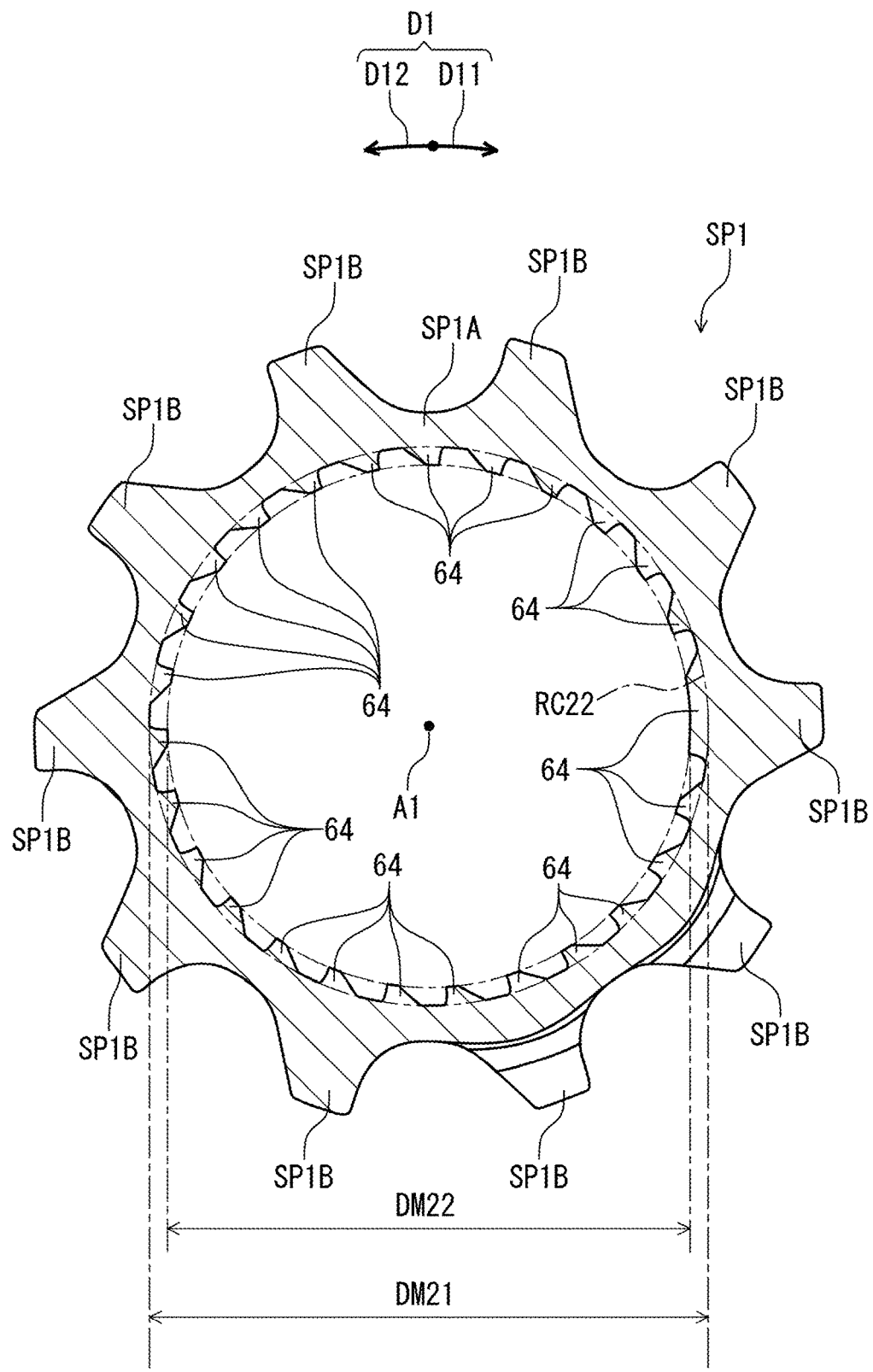
FIG. 29 is a cross-sectional view of the smallest sprocket illustrated in FIG. 24.

As seen in FIG. 29, the at least one internal spline tooth 64 has an internal-spline major diameter DM21. The at least one internal spline tooth 64 has an internal-spline root circle RC22 having the internal-spline major diameter DM21. However, the internal-spline root circle RC22 can have another diameter different from the internal-spline major diameter DM21. The internal-spline major diameter DM21 equal to or smaller than 30 mm. The internal-spline major diameter DM21 is equal to or larger than 25 mm. The internal-spline major diameter DM21 is equal to or larger than 29 mm. In this embodiment, the internal-spline major diameter DM21 is 29.8 mm. However, the internal-spline major diameter DM21 is not limited to this embodiment and the above ranges.

The at least one internal spline tooth 64 has an internal-spline minor diameter DM22 equal to or smaller than 28 mm. The internal-spline minor diameter DM22 is equal to or larger than 25 mm. The internal-spline minor diameter DM22 is equal to or larger than 27 mm. In this embodiment, the internal-spline minor diameter DM22 is 27.7 mm. However, the internal-spline minor diameter DM22 is not limited to this embodiment and the above ranges.

As seen in FIG. 28, the plurality of internal-spline driving surface 66 includes the radially outermost edge 66A and the radially innermost edge 66B. The plurality of internal-spline driving surfaces 66 each includes a radial length RL21 defined from the radially outermost edge 66A to the radially inner most edge 66B. A total of the radial lengths RL21 of the plurality of internal-spline driving surfaces 66 is equal to or larger than 7 mm. The total of the radial lengths RL21 is equal to or larger than 10 mm. The total of the radial lengths RL21 is equal to or larger than 15 mm. In this embodiment, the total of the radial lengths RL21 is 19.5 mm. However, the total of the radial lengths RL21 is not limited to this embodiment and the above ranges.

The plurality of internal spline tooth 64 has an additional radial length RL22. The additional radial lengths RL22 are respectively defined from the internal-spline root circle RC22 to radially innermost ends 64A of the plurality of internal spline teeth 64. A total of the additional radial lengths RL22 is equal to or larger than 12 mm. In this embodiment, the total of the additional radial lengths RL22 is 27.95 mm. However, the total of the additional radial lengths RL22 is not limited to this embodiment and the above ranges.

At least one of the internal spline tooth 64 has an asymmetric shape with respect to a circumferential tooth-tip center line CL2. The circumferential tooth-tip center line CL2 is a line connecting the rotational center axis A1 and a circumferential center point CP2 of the radially innermost end 64A of the internal spline tooth 64. However, at least one of the internal spline teeth 64 can have a symmetric shape with respect to the circumferential tooth-tip center line CL2. The at least one of the internal spline tooth 64 comprises the internal-spline driving surface 66 and the internal-spline non-driving surface 68.

The internal-spline driving surface 66 has a first internal-spline-surface angle AG21. The first internal-spline-surface angle AG21 is defined between the internal-spline driving surface 66 and a first radial line L21. The first radial line L21 extends from the rotational center axis A1 of the bicycle rear sprocket assembly 14 to the radially outermost edge 66A of the internal-spline driving surface 66. The first internal pitch angle PA21 or the second internal pitch angle PA22 is defined between the adjacent first radial lines L21 (see, e.g., FIG. 26).

The internal-spline non-driving surface 68 has a second internal-spline-surface angle AG22. The second internal-spline-surface angle AG22 is defined between the internal-spline non-driving surface 68 and a second radial line L22. The second radial line L22 extends from the rotational center axis A1 of the bicycle rear sprocket assembly 14 to the radially outermost edge 68A of the internal-spline non-driving surface 68.

In this embodiment, the second internal-spline-surface angle AG22 is different from the first internal-spline-surface angle AG21. The first internal-spline-surface angle AG21 is smaller than the second internal-spline-surface angle AG22. However, the first internal-spline-surface angle AG21 can be equal to or larger than the second internal-spline-surface angle AG22.

The first internal-spline-surface angle AG21 ranges from 0 degree to 10 degrees. The second internal-spline-surface angle AG22 ranges from 0 degree to 60 degrees. In this embodiment, the first internal-spline-surface angle AG21 is 5 degrees. The second internal-spline-surface angle AG22 is 45 degrees. However, the first internal-spline-surface angle AG21 and the second internal-spline-surface angle AG22 are not limited to this embodiment and the above ranges.

Figure 30:
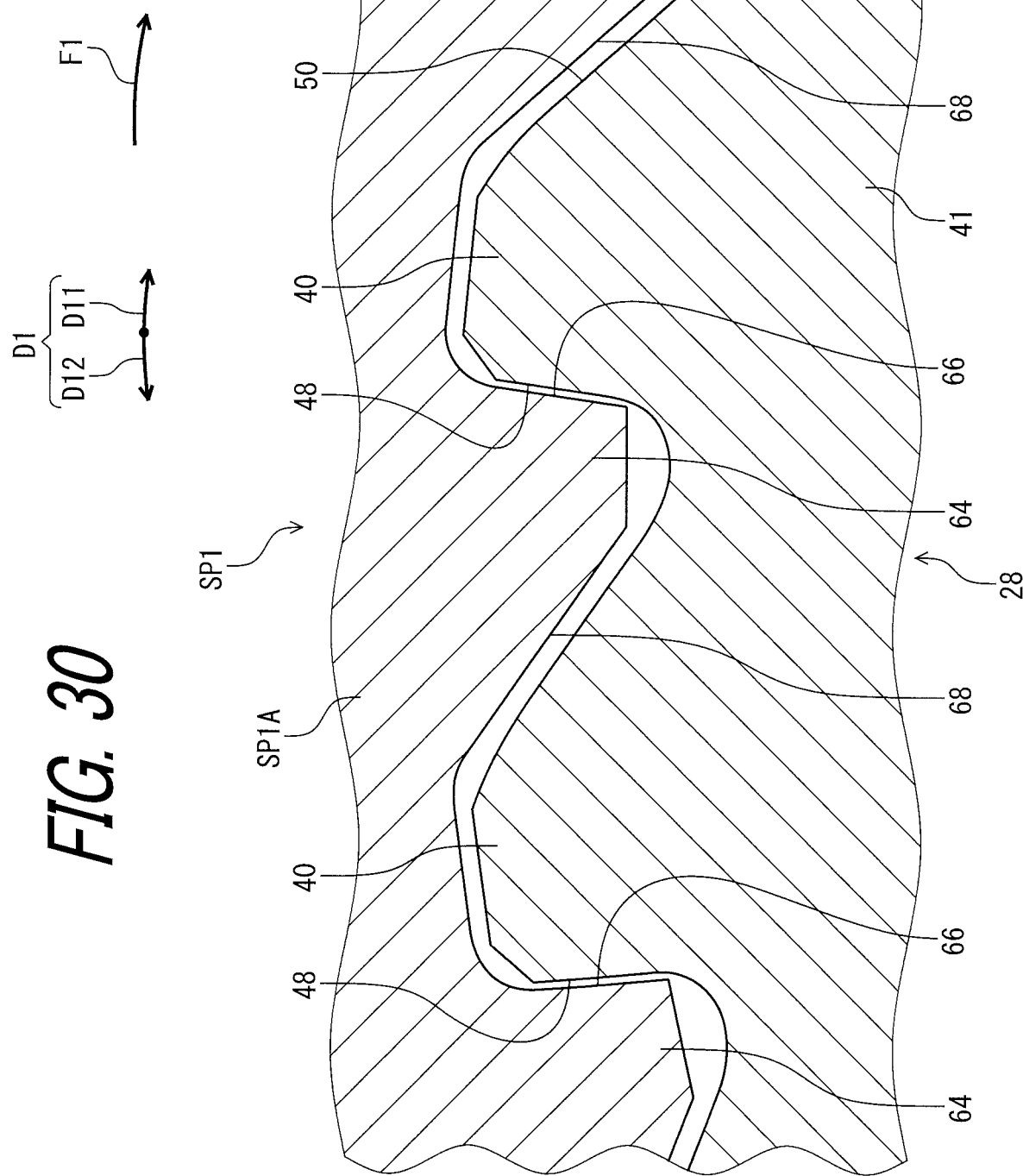
FIG. 30 is a cross-sectional view of the sprocket support body and the smallest sprocket of the bicycle drive train illustrated in FIG. 2.

As seen in FIG. 30, the internal spline teeth 64 mesh with the external spline teeth 40 to transmit the driving rotational force F1 from the sprocket SP1 to the sprocket support body 28. The internal-spline driving surface 66 is contactable with the external-spline driving surface 48 to transmit the driving rotational force F1 from the sprocket SP1 to the sprocket support body 28. The internal-spline non-driving surface 68 is spaced apart from the external-spline non-driving surface 50 in a state where the internal-spline driving surface 66 is in contact with the external-spline driving surface 48.

Figure 31:
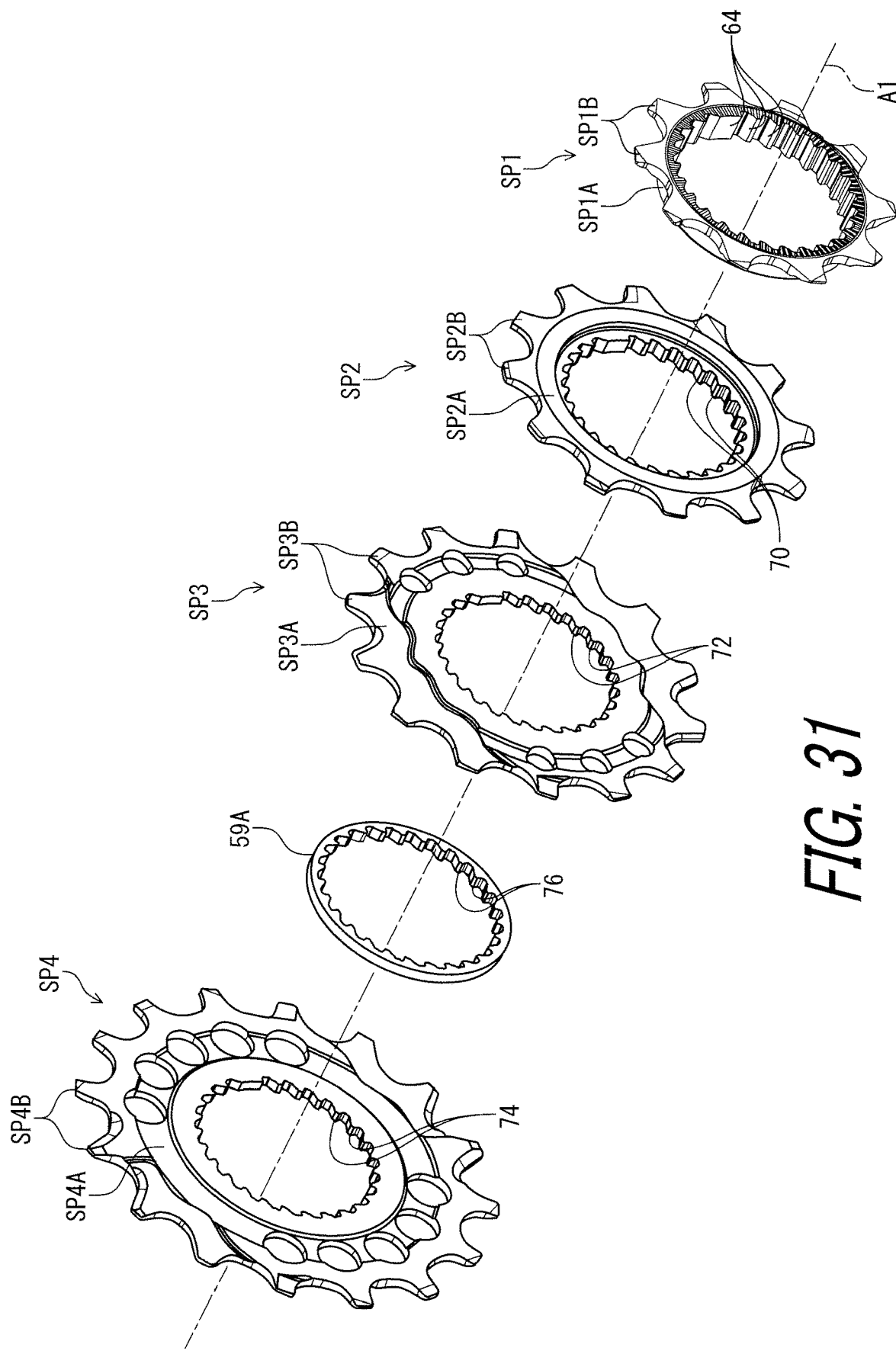
FIG. 31 is a partial exploded perspective view of the bicycle rear sprocket assembly illustrated in FIG. 17.
Figure 32:
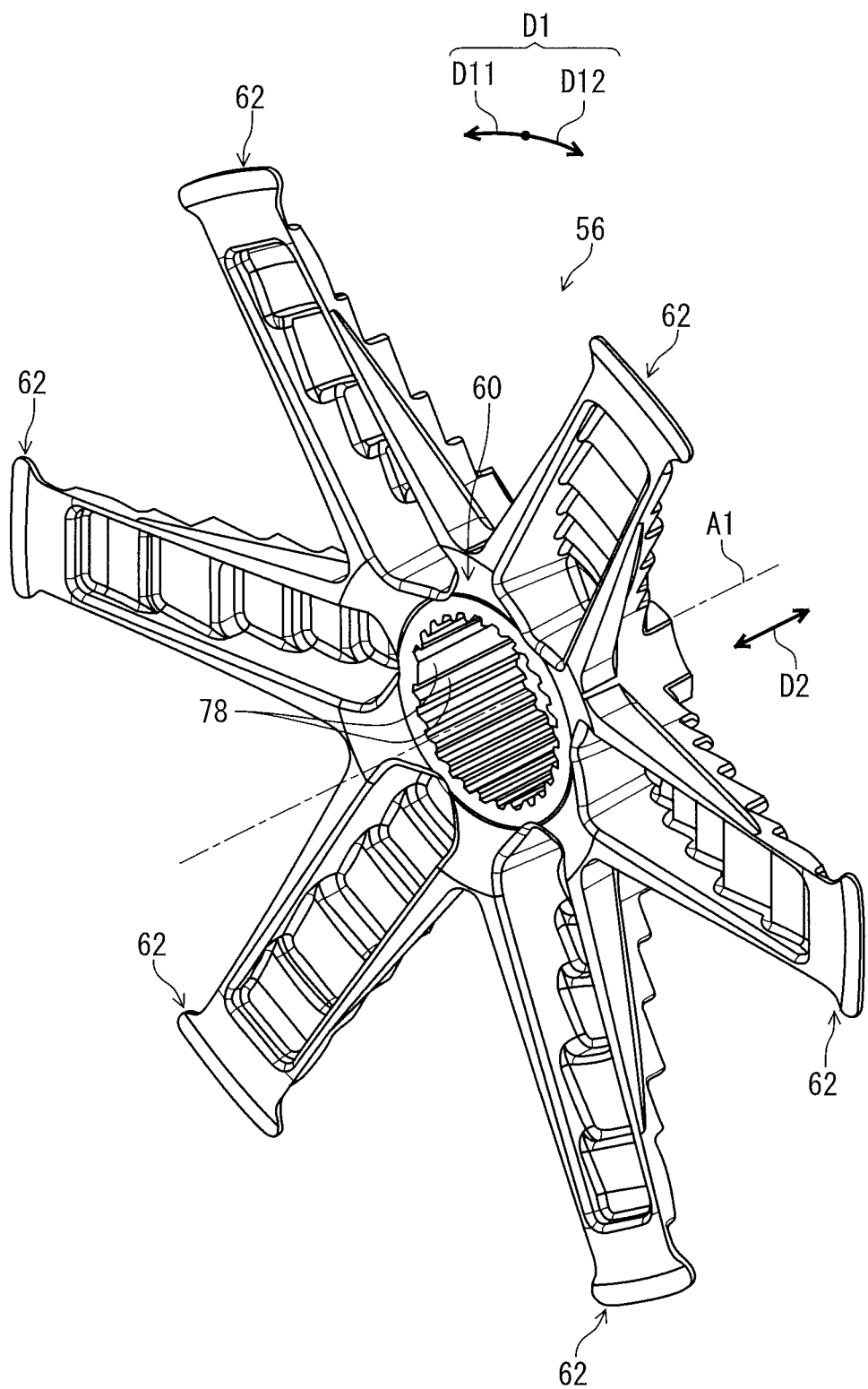
FIG. 32 is a perspective view of a sprocket support of the bicycle rear sprocket assembly illustrated in FIG. 17.

As seen in FIG. 31, the sprocket SP2 includes a plurality of internal spline teeth 70. The sprocket SP3 includes a plurality of internal spline teeth 72. The sprocket SP4 includes a plurality of internal spline teeth 74. The first ring 59A includes a plurality of internal spline teeth 76. As seen in FIG. 32, the hub engagement part 60 of the sprocket support 56 includes a plurality of internal spline teeth 78. The plurality of internal spline teeth 70 has substantially the same structure as that of the plurality of internal spline teeth 64. The plurality of internal spline teeth 72 has substantially the same structure as that of the plurality of internal spline teeth 64. The plurality of internal spline teeth 74 has substantially the same structure as that of the plurality of internal spline teeth 64. The plurality of internal spline teeth 76 has substantially the same structure as that of the plurality of internal spline teeth 64. The plurality of internal spline teeth 78 has substantially the same structure as that of the plurality of internal spline teeth 64. Thus, they will not be described in detail here for the sake of brevity.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A sprocket support body configured to be rotatably mounted on a hub axle of a bicycle hub assembly about a rotational center axis of the bicycle hub assembly, the sprocket support body comprising:

a base support having a first axial end portion and a second axial end portion;

at least ten external spline teeth provided on the first axial end portion of the base support and configured to engage with a bicycle rear sprocket assembly, each of the at least ten external spline teeth having an external-spline driving surface and an external-spline non-driving surface, the at least ten external spline teeth being integrally formed as a one-piece unitary member; and a plurality of helical external spline teeth provided on the second axial end portion of the base support;

the at least ten external spline teeth including a plurality of external-spline driving surfaces to receive a driving rotational force from the bicycle rear sprocket assembly during pedaling;

the plurality of external-spline driving surfaces each including:
a radially outermost edge;
a radially innermost edge; and
a radial length defined from the radially outermost edge to the radially innermost edge;

a total of the radial lengths of the plurality of external-spline driving surfaces being equal to or larger than 7 mm;

at least one external-spline driving surface of the plurality of external-spline driving surfaces having a first external-spline-surface angle defined between the at least one external-spline driving surface of the plurality of external-spline driving surfaces and a first radial line extending from the rotational center axis to the radially outermost edge of the at least one external-spline driving surface of the plurality of external-spline driving surfaces;

the first external-spline-surface angle ranging from 0 degree to 10 degrees;

at least nine external spline teeth of the at least ten external spline teeth each having a same spline profile that continuously extends along an entire length of each of the at least nine external spline teeth when viewed along the rotational axis;

the sprocket support body including a larger-diameter part and an axially sprocket abutment surface provided on the larger-diameter part;

a groove being provided between the larger-diameter part and the at least ten external spline teeth in an axial direction of the sprocket support body;

the groove extends continuously about an entire circumference of the sprocket support body;

a total number of the at least ten external spline teeth being larger than a total number of the plurality of helical external spline teeth, the sprocket support body including a flange extending radially outwardly from the base support, the flange being provided between the larger-diameter part and the plurality of helical external spline teeth in the axial direction, the flange extending radially outward beyond a radially outermost surface of the larger-diameter part, and the flange having an outer portion that extends in the axial direction away from the larger-diameter part and toward the plurality of helical external spline teeth.

2. The sprocket support body according to claim 1, wherein the total number of the at least ten external spline teeth is equal to or larger than 20.

3. The sprocket support body according to claim 1, wherein the at least ten external spline teeth have a first external pitch angle and a second external pitch angle different from the first external pitch angle.

4. The sprocket support body according to claim 1, wherein at least one of the at least ten external spline teeth has a first spline shape different from a second spline shape of another of the at least ten external spline teeth.

5. The sprocket support body according to claim 1, wherein at least two external spline teeth of the at least ten external spline teeth are circumferentially arranged to define a first external pitch angle with respect to the rotational center axis of the bicycle hub assembly, and the first external pitch angle ranges from 10 degrees to 20 degrees.

6. The sprocket support body according to claim 5, wherein the first external pitch angle ranges from 12 degrees to 15 degrees.

7. The sprocket support body according to claim 5, wherein at least two external spline teeth of the plurality of external spline teeth are circumferentially arranged to define a second external pitch angle with respect to the rotational center axis of the bicycle hub assembly, and the second external pitch angle is different from the first external pitch angle.

8. The sprocket support body according to claim 1, wherein the total of the radial lengths is equal to or larger than 10 mm.

9. The sprocket support body according to claim 1, wherein one tooth of the at least ten external spline teeth having a first circumferential spline size defined at a radially outermost end, the at least nine external spline teeth of the at least ten external spline teeth each having a second circumferential spline size defined at a radially outermost end, and the second circumferential spline size being smaller than the first circumferential spline size.

10. The sprocket support body according to claim 1, wherein the one tooth of the at least ten external spline teeth having a first circumferential maximum width, the at least nine external spline teeth of the at least ten external spline teeth each having a second circumferential maximum width, and the second circumferential maximum width being smaller than the first circumferential maximum width.

11. The sprocket support body according to claim 1, wherein a first circumferential gap being defined between circumferential maximum widths of one pair of adjacent external spline teeth of the at least ten external spline teeth, a plurality of second circumferential gaps being defined between circumferential maximum widths of the other pairs of adjacent external spline teeth of the at least ten external spline teeth, and the first circumferential gap being equal to each of the plurality of second circumferential gaps.

12. The sprocket support body according to claim 1, wherein the base support has a tubular shape, the at least ten external spline teeth extend radially outwardly from the base support, and the groove extends radially inwardly to the base support.

13. A sprocket support body configured to be rotatably mounted on a hub axle of a bicycle hub assembly about a rotational center axis of the bicycle hub assembly, the sprocket support body comprising:

at least ten external spline teeth configured to engage with a bicycle rear sprocket assembly, each of the at least ten external spline teeth having an external-spline driving surface and an external-spline non-driving surface;

the at least ten external spline teeth including a plurality of external-spline driving surfaces to receive a driving rotational force from the bicycle rear sprocket assembly during pedaling;

the plurality of external-spline driving surfaces each including:

a radially outermost edge;

a radially innermost edge; and a radial length defined from the radially outermost edge to the radially innermost edge;

a total of the radial lengths of the plurality of external-spline driving surfaces being equal to or larger than 7 mm;

at least one external-spline driving surface of the plurality of external-spline driving surfaces having a first external-spline-surface angle defined between the at least one external-spline driving surface of the plurality of external-spline driving surfaces and a first radial line extending from the rotational center axis to the radially outermost edge of the at least one external-spline driving surface of the plurality of external-spline driving surfaces;

the first external-spline-surface angle ranging from 0 degree to 10 degrees;

one tooth of the at least ten external spline teeth having a first circumferential spline size defined at a radially outermost end;

the other teeth of the at least ten external spline teeth each having a second circumferential spline size defined at a radially outermost end, the second circumferential spline size is smaller than the first circumferential spline size;

the one tooth of the at least ten external spline teeth having a first circumferential maximum width;

the other teeth of the at least ten external spline teeth each having a second circumferential maximum width, the second circumferential maximum width is smaller than the first circumferential maximum width;

a total number of the other teeth of the at least ten external spline teeth being equal to or larger than nine; and circumferential gaps between circumferential maximum widths of each of adjacent external spline teeth of the at least ten external spline teeth are equal in length.

14. The sprocket support body according to claim 13, wherein a total number of the at least ten external spline teeth is equal to or larger than 20.

15. The sprocket support body according to claim 13, wherein the at least ten external spline teeth have a first external pitch angle and a second external pitch angle different from the first external pitch angle.

16. The sprocket support body according to claim 13, wherein at least one of the at least ten external spline teeth has a first spline shape different from a second spline shape of another of the at least ten external spline teeth.

17. The sprocket support body according to claim 13, wherein at least two external spline teeth of the at least ten external spline teeth are circumferentially arranged to define a first external pitch angle with respect to the rotational center axis of the bicycle hub assembly, and the first external pitch angle ranges from 10 degrees to 20 degrees.

18. The sprocket support body according to claim 17, wherein the first external pitch angle ranges from 12 degrees to 15 degrees.

19. The sprocket support body according to claim 17, wherein at least two external spline teeth of the plurality of external spline teeth are circumferentially arranged to define a second external pitch angle with respect to the rotational center axis of the bicycle hub assembly, and the second external pitch angle is different from the first external pitch angle.

20. The sprocket support body according to claim 13, wherein the total of the radial lengths is equal to or larger than 10 mm.

* * * * *